(12) United States Patent
Schnelle et al.

(10) Patent No.: US 7,281,206 B2
(45) Date of Patent: Oct. 9, 2007

(54) MAINTENANCE OF A MARKUP LANGUAGE DOCUMENT IN A DATABASE

(75) Inventors: Christoph Schnelle, Burringbar (AU); Geoffrey John Nolan, Lane Cove (AU)

(73) Assignee: TimeBase Pty Limited, Sydney (AU)

( * ) Notice: Subject to any disclaimer, the term of this patent is extended or adjusted under 35 U.S.C. 154(b) by 441 days.

(21) Appl. No.: 10/294,384

(22) Filed: Nov. 14, 2002

(65) Prior Publication Data

US 2003/0177443 A1   Sep. 18, 2003

Related U.S. Application Data

(60) Provisional application No. 60/332,253, filed on Nov. 16, 2001.

(51) Int. Cl.
*G06F 15/00* (2006.01)
(52) U.S. Cl. ..................................... 715/513
(58) Field of Classification Search ................ 715/500, 715/513, 501.1
See application file for complete search history.

(56) References Cited

U.S. PATENT DOCUMENTS

| | | | |
|---|---|---|---|
| 4,558,413 A | 12/1985 | Schmidt et al. | |
| 4,627,019 A | 12/1986 | Ng | |
| 4,714,992 A | 12/1987 | Gladney et al. | |
| 4,853,843 A | 8/1989 | Ecklund | |
| 4,875,159 A | 10/1989 | Cary et al. | |
| 5,287,496 A | 2/1994 | Chen et al. | |
| 5,302,660 A | 4/1994 | Klinksiek et al. | |
| 5,355,472 A | 10/1994 | Lewis | |
| 5,732,257 A | 3/1998 | Atkinson et al. | |
| 5,740,425 A | 4/1998 | Povilus | |
| 5,835,087 A | 11/1998 | Herz et al. | |
| 5,892,513 A | 4/1999 | Fay | |

(Continued)

FOREIGN PATENT DOCUMENTS

WO          97/15890         1/1997

(Continued)

OTHER PUBLICATIONS

Lim et al., An Automated Approach for Retrieving Hierarchical Data from HTML Tables, ACM 1999, pp. 466-474.*

(Continued)

*Primary Examiner*—Cong-Lac Huynh
(74) *Attorney, Agent, or Firm*—Jones Day

(57) ABSTRACT

A method, an apparatus and a computer program product for converting an XML encoded document into an equivalent SQL table are provided. An arbitrary XML DTD may be converted into an equivalent form by means of which individual node documents stored in the SQL table may be directly accessed. The SQL table is able to be converted back into an XML document of similar structure to the original document from which the table was derived. A set of operations which can be performed on the SQL table is also disclosed. An arbitrarily complex XML document may be broken into suitably sized portions, each of which can be managed independently as a standalone XML document without compromising the validity of the document as a whole. The management of these portions takes advantage of the speed, robustness and maturity of RDBMS systems, while maintaining the hierarchical structure inherent in all XML documents.

80 Claims, 16 Drawing Sheets

U.S. PATENT DOCUMENTS

| | | | |
|---|---|---|---|
| 5,935,210 A | 8/1999 | Stark | |
| 5,963,208 A | 10/1999 | Dolan et al. | |
| 6,026,388 A | 2/2000 | Liddy et al. | |
| 6,144,962 A | 11/2000 | Weinberg et al. | |
| 6,185,576 B1 | 2/2001 | McIntosh | |
| 6,189,019 B1 | 2/2001 | Blumer et al. | |
| 6,233,592 B1 | 5/2001 | Schnelle et al. | |
| 6,421,656 B1 | 7/2002 | Cheng et al. | |
| 6,502,101 B1 | 12/2002 | Verprauskus et al. | |
| 6,529,905 B1* | 3/2003 | Bray et al. | 707/8 |
| 6,542,911 B2 | 4/2003 | Chakraborty et al. | |
| 6,581,062 B1 | 6/2003 | Draper et al. | |
| 6,584,459 B1 | 6/2003 | Chang et al. | |
| 6,584,480 B1 | 6/2003 | Ferrel et al. | |
| 6,606,653 B1 | 8/2003 | Ackermann et al. | |
| 6,636,845 B2 | 10/2003 | Chau et al. | |
| 6,643,633 B2 | 11/2003 | Chau et al. | |
| 6,708,186 B1 | 3/2004 | Claborn et al. | |
| 6,721,727 B2 | 4/2004 | Chau et al. | |
| 6,772,139 B1 | 8/2004 | Smith, III | |
| 6,823,495 B1 | 11/2004 | Vedula et al. | |
| 6,826,726 B2 | 11/2004 | Hsing et al. | |
| 6,832,219 B2* | 12/2004 | Lal | 707/3 |
| 6,853,997 B2 | 2/2005 | Wotring et al. | |
| 6,886,005 B2* | 4/2005 | Davis | 707/2 |
| 6,944,817 B1* | 9/2005 | Danneels | 715/513 |
| 6,947,945 B1* | 9/2005 | Carey et al. | 707/102 |
| 7,075,536 B1* | 7/2006 | Goldschmidt | 345/440 |
| 2001/0047372 A1 | 11/2001 | Gorelik et al. | |
| 2002/0010711 A1* | 1/2002 | Nakanishi et al. | 707/501.1 |
| 2002/0023091 A1 | 2/2002 | Silberberg et al. | |
| 2002/0116371 A1 | 8/2002 | Dodds et al. | |
| 2002/0120630 A1 | 8/2002 | Christianson et al. | |
| 2002/0129052 A1 | 9/2002 | Glazer et al. | |
| 2002/0133484 A1 | 9/2002 | Chau et al. | |
| 2002/0156811 A1* | 10/2002 | Krupa | 707/513 |
| 2002/0169788 A1* | 11/2002 | Lee et al. | 707/104.1 |
| 2002/0194357 A1 | 12/2002 | Harris et al. | |
| 2003/0041305 A1 | 2/2003 | Schnelle et al. | |
| 2003/0070144 A1 | 4/2003 | Schnelle et al. | |
| 2003/0140308 A1* | 7/2003 | Murthy et al. | 715/500 |
| 2003/0167456 A1 | 9/2003 | Sabharwal | |
| 2003/0226108 A1* | 12/2003 | Oezgen | 715/513 |
| 2004/0139327 A1* | 7/2004 | Brown et al. | 713/176 |
| 2004/0183831 A1* | 9/2004 | Ritchy et al. | 345/762 |
| 2004/0220927 A1* | 11/2004 | Murthy et al. | 707/4 |
| 2005/0278475 A1* | 12/2005 | Karatal et al. | 711/100 |
| 2006/0181531 A1* | 8/2006 | Goldschmidt | 345/440 |

FOREIGN PATENT DOCUMENTS

| | | |
|---|---|---|
| WO | 98/34179 | 8/1998 |

OTHER PUBLICATIONS

Eisenberg et al., SQL/XML is Marking Good Progress, Google, SIGMOD Record Jun. 2002, pp. 101-108.*
Fong et al., Converting Relational Database into XML Document, IEEE 2001, pp. 61-65.*
Nambiar et al., Current Approaches to XML Management, IEEE 2002, pp. 43-51.*
Khan et al., A Performance Evaluation of Storing XML Data in Relational Database Management Systems, ACM 2001, pp. 31-38.*
Shanmugasundaram et al., Efficiently Publishing Relational Data as XML Documents, Google Apr. 2001, pp. 133-154.*
Print-out of web page at URL: http://www.xml.com/pub/a/2001/06/20/databases.html.
Arnold-Moore, Timothy and Sacks-Davis, Ron; Databases of Legislation; the Problems of Consolidations, Collaborative Information Technology Research Institute, May 15, 1994.
Freeman, Simon and Callum, Euan; A Brief History of Time Travel; Legal Information Management 4 (2004) pp. 28-30.
http://www.complinet.com/home/about.
http://www.complinet.com/home/news_rules/.
DeRose, W3C: XML Linking Language XLink, Dec. 20, 2000, W3C, Version 1.0, pp. 1-27.
Adrenne Azaria "SGML: A lifesaver in a Sea of Electronic Documents." Network World 1/50, Dec. 12, 1994.
Legal Database program entitled Status utilizing Folio Bound Views, Pub 1994.
Morrison Michael et al. XML Unleashed, Sam's Publishing Indianapolis, IN, Dec. 1999, pp. 398-415, 482-489, 506-507 and 518-519.
"DB2 Universal database XML extender: Web-enabling you Data with XML", IBM product information sheet 200, 2 pages.
Baru, Chautanya, "Xviews: VML Views of Relational Schemas" San Diego Supercomputer Center Technical Report, SDSC TR-100-3, Oct. 199, 18 pages.
Sturm, Jake Developing XML Solutions, Microsoft Press, Redmond, WA 2000, pp. 287-289, 347-348 and 359-366.
Harold, Elliotte Rusty, XML: Extesible Markup Language, IDG Boks Worldwide. Inc., Foster City 1198, pp. 32-39, 57-59, 66-70 and 96-99.
http://www.sweetandmaxwell.co.uk/westlaw/pdfs/user_guide.pdf, 2006.
http://www.sweetandmaxwell.co.uk/about/history.html, 2003.
http://www.sweetandmaxwell.co.uk/westlaw/about.htm, 2006.
http://www.butterworths.com/about/index.htm, 2000.
http://www.complinet.com/home/share/pdf/news_rules/uk/companylaw_NR_insert.pdf, 2006.
http://www.pendragon.co.uk/perspective, 2001.
http://www.pendragon.co.uk/perspective/perspective3.htm, 2001.
Promenschenkel, "STEPS: toward a new era in electronic publishing", OCLC Newsletter, Jul./Aug. 1995, No. 216, found at website: http://digitalarchive.oclc.org/da/ViewObjectMain.jsp;jsessionid=84ae0c5fi82409328f8d87a14475bd40eaaceff43afd?fileid=0000001695:000000042504®i.
Search Report of Corresponding European Appl. No. 98 901 249.7—1527, Jan. 28, 2005.
Kim et al., "OOHS: An Object-Oriented Hypermedia System", COMPSAC, Seoul, KR, Aug. 21, 1996-Aug. 23, 1996, pp. 496-501, IEEE, XP 000684382, IEEE Comp. Soc. Los Alamitos, CA US ISBN: 0-8186-7579-9.
Arnold-Moore et al., "The ELF data model and SGQL query language for structured document databases", Sixth Australasian Database Conf., ADC'95, Adelaide, AU, [Online] vol. 17, No. 2, Jan. 30, 1995-Jan. 31, 1995, pp. 17-26, XP002204886, Australian Computer Science Communications ISSN: 0157-3055 Retrieved from the Internet: URL:http://www.mds.rmit.edu.au/~tja/papers/index.html>.
P. Francois, "Generalized SGML repositories: Requirements and modeling", Computer Standards and Interfaces, vol. 18, No. 1, 1996, pp. 11-24, XP004006104, Elsevier Sequoia, Lausanne, CH ISSN: 0920-5489.
Dayen, Igor, "Storing XML is Relational Databases", XML.com, www.xml.com/lpt/a/803, Jun. 20, 2001, pp. 1-13.
WR Communication pursuant to Article 115(c) EPC, Nov. 30, 2006.
Communication pursuant to Article 115(c) and responsive to "WR Communication pursuant to Article 115(c) EPC, Nov. 30, 2006" EPC, Jan. 26, 2007.
Arnold-Moore et al. "Models for Structured Document Database Systems", Royal Melbourne Institute of Technology, 1998.
Arnold-Moore, "Automatic Generation of Amendment Legislation", ACM 1997.
Arnold-Moore et al. "Connected to the Law: Tasmanian Legislation Using EnAct", InQuirion Pty Ltd., 2002.
Sacks-Davis et al. "Database Systems for Structured Documents", International Symposium on Advanced Database Technologies and Their Integration, Japan, 2002.
Sacks-Davis et al., "A Standards-Based Approach to Combining Information Retrieval and Database Functionality", International Journal of information Technology, 1(1):1-15, 1995.

Arnold-Moore, "Automatically, Processing Amendments to Legislation", ACM 1995.

Jan. 18, 2007 letter enclosing website entitled "The Information Society Creative Awards 1996", available at: http://met.open.ac.uk/isca/, 1996.

ActiveTEXT Datasheet, available at: http://web.archive.org/web/19970630042435/www.ais.co.uk/atds.html, 1997.

Jan. 19, 2007 letter in response to Jan. 18, 2007 letter enclosing website entitled "The Information Society Creative Awards 1996", available at: http://met.open.ac.uk/isca/, 1996.

Office Action of Corresponding European Appl. No. 98 901 249.7—1527, Jan. 25, 2007.

Maioli C. et al., "Versioning Issues in a Collaborative Distributed Hypertext System" Technical Report Universita Di Bologna, Apr. 1993.

Reexamination Request from US Patent No. 6,233,592; Jan. 29, 2007.

Order Granting Reexamination Request from US Patent No. 6,233,592, Apr. 3, 2007.

*TimeBase Pty Ltd.* v *The Thompson Corp.*, U.S. District Court for the Northern District of Illinois, Complaint filed Jan. 24, 2007.

* cited by examiner

```xml
<?xml version="1.0"?>
<!DOCTYPE chapter
        PUBLIC "-//TimeBase Ltd//DTD Sample Chapter//EN">

<!-- This document illustrates MALTbase conversions.
     Note that the node elements are: chapter, part, section, note.   -->

<chapter shortref="Ch 3">
    <label>3</label>
    <desc sdate="1996-07-15">Directors' Responsibilities</desc>

<part shortref="Ch 3, Pt A">
        <label>A</label>
        <desc sdate="1996-07-15">Common Law</desc>

<section shortref="s 56">
                <label>56</label>
                <p>Text of s 56</p>

<note>
                        <p>s 56 note</p>
                </note>
        </section>

<section shortref="s 56A" sdate="2001-03-23">
                <label>56A</label>
                <p>Text of s 56A</p>
        </section>

<note>
                <p>part A note</p>
        </note>

<link>The next part is Part B</link>
    </part>

<part shortref="Ch 3, Pt B">
        <label>B</label>
        <desc sdate="1996-07-15" edate="2001-03-22">
                Corporate Governance Act</desc>
        <desc sdate="2001-03-23">
                Corporate Governance and Disclosure Act</desc>

<section shortref="s 57">
                <label>57</label>
                <p>Text of s 57</p>
        </section>
    </part>

<link>The next chapter is Chapter 3D</link>
</chapter>
```

```
<!--
    Sample XML DTD fragment
                                                        210
    Public ID: "-//TimeBase Ltd//Sample Chapter//EN"
-->
                                                        220
<!ELEMENT chapter (label, desc+, (part | note)+, link?) >
<!ATTLIST chapter
    shortref CDATA #REQUIRED >
                                                        230
<!ELEMENT part (label, desc+, (section | note)+) , link?>
<!ATTLIST part
    shortref CDATA #REQUIRED
    sdate CDATA #IMPLIED
    edate CDATA #IMPLIED >

<!ELEMENT section (label, desc?, p+, note*) >          240
<!ATTLIST section
    shortref CDATA #REQUIRED
    sdate CDATA #IMPLIED
    edate CDATA #IMPLIED >
                                                        250
<!ELEMENT note (p+) >

<!ELEMENT label (#PCDATA) >

<!ELEMENT desc (#PCDATA) >                             260
<!ATTLIST desc
    sdate CDATA #IMPLIED
    edate CDATA #IMPLIED >

<!ELEMENT p (#PCDATA) >

<!ELEMENT link (#PCDATA) >
```

Fig. 2

```
<!--
    Sample DTD - original form
    Public ID: "-//XYZ Pty Ltd//DTD Sample//EN"
-->

<!ELEMENT level-1 (level-2 | text)* >
<!ATTLIST level-1
    name CDATA #REQUIRED >
<!ELEMENT level-2 (level-3 | text)* >
<!ATTLIST level-2
    name CDATA #REQUIRED >
<!ELEMENT level-3 (text*) >
<!ATTLIST level-3
    name CDATA #REQUIRED >
<!ELEMENT text (#PCDATA) >
```

Fig. 4a

```
<!--
    Sample DTD - modified for use with MALTbase                    410
    Public ID: "-//XYZ Pty Ltd//MALTbase DTD Sample//EN"
-->
                                                          450
<!ELEMENT level-1 ((level-2|MALTbase:level-2) | text)* >
<!ATTLIST level-1
    name CDATA #REQUIRED >

420
<!ELEMENT MALTbase:level-1 EMPTY>
<!ATTLIST MALTbase:level-1
    xmlns:MALTbase
        CDATA #FIXED "http://www.malt.com/xmlns/MALTbase"
    child-id
        CDATA #REQUIRED>                              460

<!ELEMENT level-2 ((level-3|MALTbase:level-3) | text)* >
<!ATTLIST level-2
430     name CDATA #REQUIRED >

<!ELEMENT MALTbase:level-2 EMPTY>
<!ATTLIST MALTbase:level-2
    xmlns:MALTbase
        CDATA #FIXED "http://www.malt.com/xmlns/MALTbase"
    child-id
        CDATA #REQUIRED>

<!ELEMENT level-3 (text*) >
<!ATTLIST level-3
440     name CDATA #REQUIRED >

<!ELEMENT MALTbase:level-3 EMPTY>
<!ATTLIST MALTbase:level-3
    xmlns:MALTbase
        CDATA #FIXED "http://www.malt.com/xmlns/MALTbase"
    child-id
        CDATA #REQUIRED>

<!ELEMENT text (#PCDATA) >
```

Fig. 4b

```
<?xml version="1.0"?>
<!DOCTYPE MALTbase:chapter
        PUBLIC "-//TimeBase Ltd//MALTbase DTD Sample Chapter//EN">

<!--    This document illustrates MALTbase conversions.
        Note that the node elements are: chapter, part, section, note.    -->

<MALTbase:chapter child-id="3"/>
```

Fig. 5a

```
<?xml version="1.0"?>
<!DOCTYPE chapter
        PUBLIC "-//TimeBase Ltd//MALTbase DTD Sample Chapter//EN">

<chapter shortref="Ch 3">
    <label>3</label>
    <desc sdate="1996-07-15">Directors' Responsibilities</desc>

<MALTbase:part child-id="1"/>
    <MALTbase:part child-id="2"/>

<link>The next chapter is Chapter 3D</link>
</chapter>
```

Fig. 5b

```
<?xml version="1.0"?>
<!DOCTYPE part
        PUBLIC "-//TimeBase Ltd//MALTbase DTD Sample Chapter//EN">

<part shortref="Ch 3, Pt A">
    <label>A</label>
    <desc sdate="1996-07-15">Common Law</desc>

<MALTbase:section child-id="40"/>
    <MALTbase:section child-id="80"/>
    <MALTbase:note child-id="b0"/>

<link>The next part is Part B</link>
</part>
```

Fig. 5c

```
<?xml version="1.0"?>
<!DOCTYPE level-1
   PUBLIC "-//XYZ Pty Ltd//Sample Document//EN">
<!-- once upon a time -->
<level-1 name="papa">
   <text>My porridge is too hot</text>
   <level-2 name="mama">
      <text>My porridge is too cold</text>
      <level-3 name="baby">
         <text>Somebody ate mine all up -
waah!</text></level-3>
      <text>My poor darling. Call the police.</text></level-2>
   <level-2 name="goldilocks">
      <text>Where's my lawyer!</text></level-2>
</level-1>
```

<?xml version="1.0"?>
<!DOCTYPE MALTbase:level-1
   PUBLIC "-//XYZ Pty Ltd//MALTbase Sample Document//EN">
<!-- once upon a time -->
<MALTbase:level-1 child-id="1"/>      (papa node)
```

<?xml version="1.0"?>
<!DOCTYPE level-1
   PUBLIC "-//XYZ Pty Ltd//MALTbase Sample Document//EN">
<level-1 name="papa">
   <text>My porridge is too hot</text>
   <MALTbase:level-2 child-id="1"/>    (mama node)
   <MALTbase:level-2 child-id="2"/>    (goldilocks)
</level-1>
```

Fig. 6c

```
<?xml version="1.0"?>
<!DOCTYPE level-2
  PUBLIC "-//XYZ Pty Ltd//MALTbase Sample Document//EN">
<level-2 name="mama">
  <text>My porridge is too cold</text>
  <MALTbase:level-3 child-id="1"/>     (baby node)
  <text>My poor darling. Call the police.</text></level-2>
```

Fig. 6d

```
<?xml version="1.0"?>
<!DOCTYPE level-3
  PUBLIC "-//XYZ Pty Ltd//MALTbase Sample Document//EN">
<level-3 name="baby">
  <text>Somebody ate mine all up - waah!</text></level-3>
```

Fig. 6e

```
<?xml version="1.0"?>
<!DOCTYPE level-2
  PUBLIC "-//XYZ Pty Ltd//MALTbase Sample Document//EN">
<level-2 name="goldilocks">
  <text>Where's my lawyer!</text></level-2>
```

| child_id | parent_id | content |
|---|---|---|
| NULL | NULL | root node |
| 3 | NULL | converted chap 3 |
| 1 | /3 | converted part A |
| 40 | /3/1 | converted s 56 |
| 08 | /3/1/40 | converted s 56 note |
| 80 | /3/1 | converted s 56A |
| b0 | /3/1 | converted part A note |
| 2 | /3 | converted part B |
| 80 | /3/2 | converted s 57 |

Fig. 7

| parent ID | child ID | content |
|---|---|---|
| NULL | NULL | Root node |
| / | 1 | papa node |
| /1 | 1 | mama node |
| /1/1 | 1 | baby node |
| /1 | 2 | goldilocks |

Fig. 8

Changes not affecting placeholders are simply stored thus

```
<?xml version="1.0"?>
<!DOCTYPE level-2
    PUBLIC "-//XYZ Pty Ltd//MALTbase Sample Document//EN">
<level-2 name="mama">
    <text>My porridge is too cold</text>
    <MALTbase:level-3 child-id="1"/>
    <text>My poor darling. Call the police.</text>
    <text>Get the fire brigade while you're at it.</text>
</level-2>
```

Nothing else changes.

Fig. 9a

To delete a node, remove the placeholder from the parent:

```
<?xml version="1.0"?>
<!DOCTYPE level-2
    PUBLIC "-//XYZ Pty Ltd//MALTbase Sample Document//EN">
<level-2 name="mama">
    <text>My porridge is too cold</text>
    <!-- mama node is now childless -->
    <text>My poor darling. Call the police.</text>
</level-2>
```

The system will automatically remove the deleted node(s) when this node is saved.

Fig. 9b

Add the material to be inserted straight into the prospective parent:

```
<?xml version="1.0"?>
<!DOCTYPE level-1
   PUBLIC "-//XYZ Pty Ltd//MALTbase Sample Document//EN">
<level-1 name="papa">
   <text>My porridge is too hot</text>
   <MALTbase:level-2 child-id="1"/>          (mama node)
   <level-2 name="pc plod">
      <text>Allo allo! Wot's all this then?</text>
   </level-2>
   <MALTbase:level-2 child-id="2"/>          (goldilocks)
</level-1>
```

Fig. 9c(1)

When the node is saved, the following new node (id=/1/1.5) is created:

```
<?xml version="1.0"?>
<!DOCTYPE level-2
   PUBLIC "-//XYZ Pty Ltd//MALTbase Sample Document//EN">
<level-2 name="pc plod">
   <text>Allo allo! Wot's all this then?</text>
</level-2>
```

Fig. 9c(2)

and the inserted text replaced (in papa node) by a placeholder:

```
<?xml version="1.0"?>
<!DOCTYPE level-1
   PUBLIC "-//XYZ Pty Ltd//MALTbase Sample Document//EN">
<level-1 name="papa">
   <text>My porridge is too hot</text>
   <MALTbase:level-2 child-id="1"/>     (mama node)
   <MALTbase:level-2 child-id="1.5"/>   (pc plod)
   <MALTbase:level-2 child-id="2"/>     (goldilocks)
</level-1>
```

Change the order of the existing placeholders:

```
<?xml version="1.0"?>
<!DOCTYPE level-1
    PUBLIC "-//XYZ Pty Ltd//MALTbase Sample Document//EN">
<level-1 name="papa">
    <text>My porridge is too hot</text>
    <MALTbase:level-2 child-id="2"/>        (goldilocks)
    <MALTbase:level-2 child-id="1"/>        (mama node)
</level-1>
```

Fig. 9d(1)

The system modifies the child IDs so they stay in ascending order:

```
<?xml version="1.0"?>
<!DOCTYPE level-1
    PUBLIC "-//XYZ Pty Ltd//MALTbase Sample Document//EN">
<level-1 name="papa">
    <text>My porridge is too hot</text>
    <MALTbase:level-2 child-id="2"/>        (goldilocks)
    <MALTbase:level-2 child-id="3"/>        (mama has a new ID)
</level-1>
```

```
<chapter shortref="Ch 7">
    . . .
    <MALTbase:part child-id="1"/>     ← 1001
    <MALTbase:part child-id="4"/>     ← 1002
    <MALTbase:part child-id="7"/>     ← 1003
    <MALTbase:part child-id="a"/>     ← 1004
    <MALTbase:note child-id="d"/>     ← 1005
    . . .
</chapter>
```

Fig. 10a

```
<chapter shortref="Ch 7">
    . . .
    <MALTbase:part child-id="1"/>        ← 1001
    <MALTbase:part child-id="/8/c/3b/2"/> ← 1006
    <MALTbase:part child-id="a"/>        ← 1004a
    <MALTbase:part child-id="7"/>        ← 1003
    <MALTbase:part child-id="a"/>        ← 1004
    <part ...><label>new part</label>    ← 1007
        <section>...
    </part>
    <MALTbase:note child-id="d"/>
    . . .
</chapter>
```

Fig. 10b

```
    <MALTbase:part child-id="1"/>     ← 1001
    <MALTbase:part child-id="x1"/>    ← 1006
    <MALTbase:part child-id="a"/>     ← 1004a
    <MALTbase:part child-id="7"/>     ← 1003
    <MALTbase:part child-id="x2"/>    ← 1004
    <part ...><label>new part</label>
        <section>...
    </part>
    <MALTbase:note child-id="d"/>
```

Fig. 10c

```
<MALTbase:part child-id="1"/>      ← 1001
<MALTbase:part child-id="x1"/>     ← 1006
<MALTbase:part child-id="a"/>      ← 1004a
<MALTbase:part child-id="x3"/>     ← 1003
<MALTbase:part child-id="x2"/>     ← 1004
<part ...><label>new part</label>
    <section>...
</part>
<MALTbase:note child-id="d"/>
```

Fig. 10d

```
<MALTbase:part child-id="1"/>      ← 1001
<MALTbase:part child-id="x1"/>     ← 1006
<MALTbase:part child-id="a"/>      ← 1004a
<MALTbase:part child-id="x3"/>     ← 1003
<MALTbase:part child-id="x2"/>     ← 1004
<MALTbase:part child-id="x4"/>     ← 1007
<MALTbase:note child-id="d"/>
```

Fig. 10e

```
<MALTbase:part child-id="1"/>
<MALTbase:part child-id="6"/>
<MALTbase:part child-id="a"/>
<MALTbase:part child-id="b"/>
<MALTbase:part child-id="c"/>
<MALTbase:part child-id="c8"/>
<MALTbase:note child-id="d"/>
```

Fig. 10f

MAINTENANCE OF A MARKUP LANGUAGE DOCUMENT IN A DATABASE

CROSS REFERENCE TO RELATED APPLICATION

This application claims priority of U.S. Provisional Patent Application Ser. No. 60/332,253 filed on Nov. 16, 2001, the contents of which are incorporated herein by reference.

TECHNICAL FIELD OF THE INVENTION

The present invention relates generally to electronic documents and, in to particular, to the storage and maintenance of complex text-based documents.

BACKGROUND

International Publication No. WO 98/34179 (PCT/AU98/00050) in the name of Time Base Pty Ltd and published on Aug. 6, 1998 and counterpart U.S. Pat. No. 6,233,592 issued on May 15, 2001 to Schnelle et al. are incorporated herein by reference. In these documents, an electronic publishing system is disclosed that provides a sparse multidimensional matrix of data using a set of flat file records. In particular, the computer-implemented system publishes an electronic publication using text-based data. Predefined portions of the text-based data are stored and used for the publication. At least one of the predefined portions is modified, and the modified version is stored as well. The predefined portion is typically a block of text, greater in size than a single word, but less than an entire document. Thus, for example, in the case of legislation, the predefined portion may be a section of the Act. Each predefined portion and the modified portion(s) are marked up with one or more links using a markup language, preferably Standard Generalized Markup Language (SGML) or eXtensible Markup Language (XML). The system also has attributes, each being a point on an axis of a multidimnensional space for organising the predefined portions and the modified portion(s) of the text-based data. This system is simply referred to as the Multi Access Layer Technology or "MALT" system hereinafter.

Australian Patent Application No. 65470/00 filed on 12 Oct., 2000 in the name of TimeBase Pty Ltd, Canadian Patent Application No. 2323245 filed on 12 Oct., 2000 in the name of TimeBase Pty Ltd, New Zealand Patent Application No. 507510 filed on 12 Oct., 2000 in the name of TimeBase Pty Ltd and U.S. patent application Ser. No. 09/689927 filed on Oct. 12, 2000 in the names of Lessing et al. are incorporated herein by reference.

Large or complex text-based datasets are typically hierarchical in nature. In the storage, maintenance and publication of such data, a markup language capable of describing such hierarchies is commonly used. XML is one such markup language that is more commonly used, particularly in the print, electronic or online publishing industries, and for government or public records or technical documentation. XML data is stored typically either in "flat" text files encoded in ASCII, Unicode, or other standard text encoding, or in a "native" XML database.

The flat text files may be part of a document management system. Such a document management system may be based on a relational database. Document management systems deal with a document as a whole and are able to store relevant data is about each document. However, document management systems are typically not designed to operate on data (XML elements) within such documents. Consequently, a document management system does not typically operate on all (or even a substantial number of the) XML elements contained in flat text files on which the document managing system is operating. An XML database, in contrast, operates on all XML elements of the XML data that the XML database is storing and, consequently, XML databases must manage large amounts of data and detail. As a result, document management systems have a limited usefulness resulting from a lack of precision, and XML databases are overwhelmed by the multiplicity of XML elements that are to be managed.

Attempts have been made to transform XML data into a set of Structured Query Language (SQL) relational database tables. SQL is a database technology that provides a user with powerful query functionality and powerful data management tools. SQL possesses the stability of a mature technology, whereas XML databases are still a relatively immature technology and thus possess a degree of instability. SQL is a fast and efficient technology, and a wide choice of software and hardware manufacturers offer or support SQL databases.

Object relational mapping techniques are typically used to convert XML data into relational databases. Conventional object relational mapping techniques, however, often attempt to capture all of the document hierarchy. This is almost never necessary and can result in substantial size and performance penalties in the resulting SQL tables. Such object relational mapping techniques typically result in a far larger number of SQL tables than is necessary.

Thus, a need exists for providing an efficient method for converting a markup language document to a set of database tables, such that the conversion is reversible. The set consists of a small, fixed number of tables and may consist of a single table. A further need exists for providing a method for converting a markup language document to a set of database tables, such that the converted markup language document can be maintained without requiring a conversion back to the original markup language format of the document.

SUMMARY

According to a first aspect of the invention, there is provided a method for converting a document encoded in a markup language into a format for mapping to a database table, the method including the steps of:

replacing the content of at least one node in the document stored in a first storage unit with a placeholder and storing the replaced content in a separate data storage unit associated with the corresponding node, the node being an instance of a node element selected from a node element set; and modifying a formal definition of markup rules associated with the document to recognise the placeholder.

According to a second aspect of the invention there is provided an apparatus for converting a document encoded in a markup language into a format for mapping to a database table, the apparatus including:

a device for replacing the content of at least one node in the document stored in a first storage unit with a placeholder and storing the replaced content in a separate data storage unit associated with the corresponding node, the node being an instance of a node element selected from a node element set; and a device for modifying a formal definition of markup rules associated with the document to recognise the placeholder.

According to a third aspect of the present invention there is provided a computer program product having a computer readable medium having a computer program recorded therein for converting a document encoded in a markup language into a format for mapping to a database table, the computer program product including:

a computer program code device for replacing the content of at least one node in the document stored in a first storage unit with a placeholder and storing the replaced content in a separate data storage unit associated with the corresponding node, the node being an instance of a node element selected from a node element set; and a computer program code device for modifying a formal definition of markup rules associated with the document to recognise the placeholder.

According to a fourth aspect of the present invention there is provided a method for converting an extensible Markup Language (XML) encoded document into an equivalent Structured Query Language (SQL) table structure, the method including the steps of:

determining a node element set for the XML encoded document, wherein each node element in the node element set is a discrete level of the document;

determining one or more nodes of the XML encoded document, each node being an instance of a node element;

allocating to each node a unique node identifier; and assembling the XML content of each node by performing the flirter steps of:

assembling XML content of the corresponding node element;

creating a separate sub-document for each node by inserting as a prefix a standard XML processing instruction, plus a DOCTYPE declaration, where the DOCTYPE element is the node element, and the public ID is the same as that of the original DTD, except that the word MALTbase is inserted as a prefix to the descriptor;

replacing any sub-node elements with equivalent empty placeholder elements in which the namespace MALTbase: has been inserted as a prefix to a element name, wherein the only non-fixed attribute is a child ID, being the ID of the sub-node relative to all other sub-nodes within the sub-node's parent; and constructing a node table record to hold the content.

According to a fifth aspect of the present invention there is provided a method for converting an eXtensible Markup Language (XML) Document Type Definition (DTD) into a form suitable for accessing pre-processed node content, the method comprising the steps of:

declaring a new MALTbase empty placeholder element for each node element in the node element set;

modifying each content model referring to a node element to refer in addition to an equivalent MALTbase placeholder element;

inserting the word MALTbase as a prefix to a descriptor of a public identifier to produce a modified public identifier; and allocating the modified public identifier to the new DTD.

According to a sixth aspect of the present invention there is provided a method for converting an extensible Markup Language (XML) Document Type Definition (DTD) into a form suitable for accessing pre-processed node content, the method comprising the steps of:

duplicating the XML DTD to create a new DTD;

assigning the new DTD a public identifier that is the same as the public ID of the XML DTD except that the word MALTbase is inserted as a prefix to the descriptor;

creating a new placeholder element for every element in the node element set, each the placeholder element having MALTbase: inserted as a prefix to the name, an empty content model; and an ATTLIST containing the two attributes:

child-id CDATA #REQUIRED xmlns:MALTbase CDATA #FIXED "http://www.malt.com/xmlns/MALTbase"; and replacing every occurrence of a node element in any content model with a group consisting of two alternatives, the original element and its MALTbase equivalent.

According to a seventh aspect of the present invention there is provided a method for reconverting a MALTbase Structured Query Language (SQL) table back into an equivalent eXtensible Markup Language (XML) document, the method including the steps of:

creating an XML document from root node content in which the MALTbase prefixes are removed from DTD public ID and the DOCTYPE;

replacing each placeholder element in the resulting document with the equivalent element from the corresponding sub-document;

repeating the above step until no further placeholders remain.

According to an eighth aspect of the present invention there is provided a method for maintaining an eXtensible Markup Language (XML) document in MALTbase Structured Query Language (SQL) form, without the need for reconverting the document to XML, the method comprising the steps of:

locating the node to be edited;

activating an edit function that locks the node for writing and establishes an edit session in which an editing tool manages content of a node; and writing the updated content back into the node record, when the edit session is finished.

According to a ninth aspect of the present invention there is provided a method for saving a modified node (principal node), the method comprising the steps of:

generating a list of placeholders in the principal node;

generating a list of existing sub-nodes from a database;

pairing off placeholders and sub-nodes;

deleting from the database any sub-node and the sub-node's descendants, if that sub-node is not matched against a placeholder;

creating a duplicate node for each placeholder not currently a sub-node of the principal node;

assigning a provisional ID to each duplicate node, wherein each ID consists of the ID of the principal node, a provisional child ED within the principal node, and a trailing portion of the ID, if the new node is a descendant of the node being copied.

scanning the list of matched placeholders in document order;

assigning a provisional child ID to any placeholder that has a lower child ID than any one of the placeholder's siblings that have already been scanned;

performing a standard MALTbase XML-to-SQL conversion on each sub-node element (not being a placeholder) present;

creating new SQL records for each of the sub-node elements;

assigning a provisional ID to each new node;

assigning a provisional child ID within the principal node;

replacing the text of each sub-node element in the principal node with a new placeholder; and assigning permanent child IDs to the placeholders to replace the provisional segment in the ID of each corresponding sub-node (or descendant).

According to another aspect of the invention there is provided a computer program product including a computer readable medium having recorded thereon a computer program for implementing any one of the methods described above.

BRIEF DESCRIPTION OF THE DRAWINGS

One or more embodiments of the present invention are described hereinafter with reference to the drawings, in which:

FIG. 1 shows a sample XML document fragment;

FIG. 2 shows an original DTD fragment for the XML fragment of FIG. 1;

FIG. 4a shows a sample DTD;

FIG. 4b shows the DTD of FIG. 4a modified in accordance with MALTbase principles;

FIG. 5a shows the mapped content of the root node of FIG. 1;

FIG. 5b shows the mapped content of the chapter node of FIG. 1;

FIG. 5c shows the mapped content of the first part node of FIG. 1;

FIG. 6a shows a sample XML document;

FIG. 6b shows a root node corresponding to the XML document of FIG. 6a;

FIGS. 6c-f show sub-nodes of the root node of FIG. 6b;

FIG. 7 shows a minimal SQL node table corresponding to the document fragment of FIG. 1;

FIG. 8 shows a sample nodes table corresponding to the XML document of FIG. 6a;

FIGS. 9a-d illustrate the results of simple database operations on the node set of FIGS. 6b-f;

FIGS. 10a-f show a graphical representation of a SQL node write-back; and

DETAILED DESCRIPTION

Figure 3:
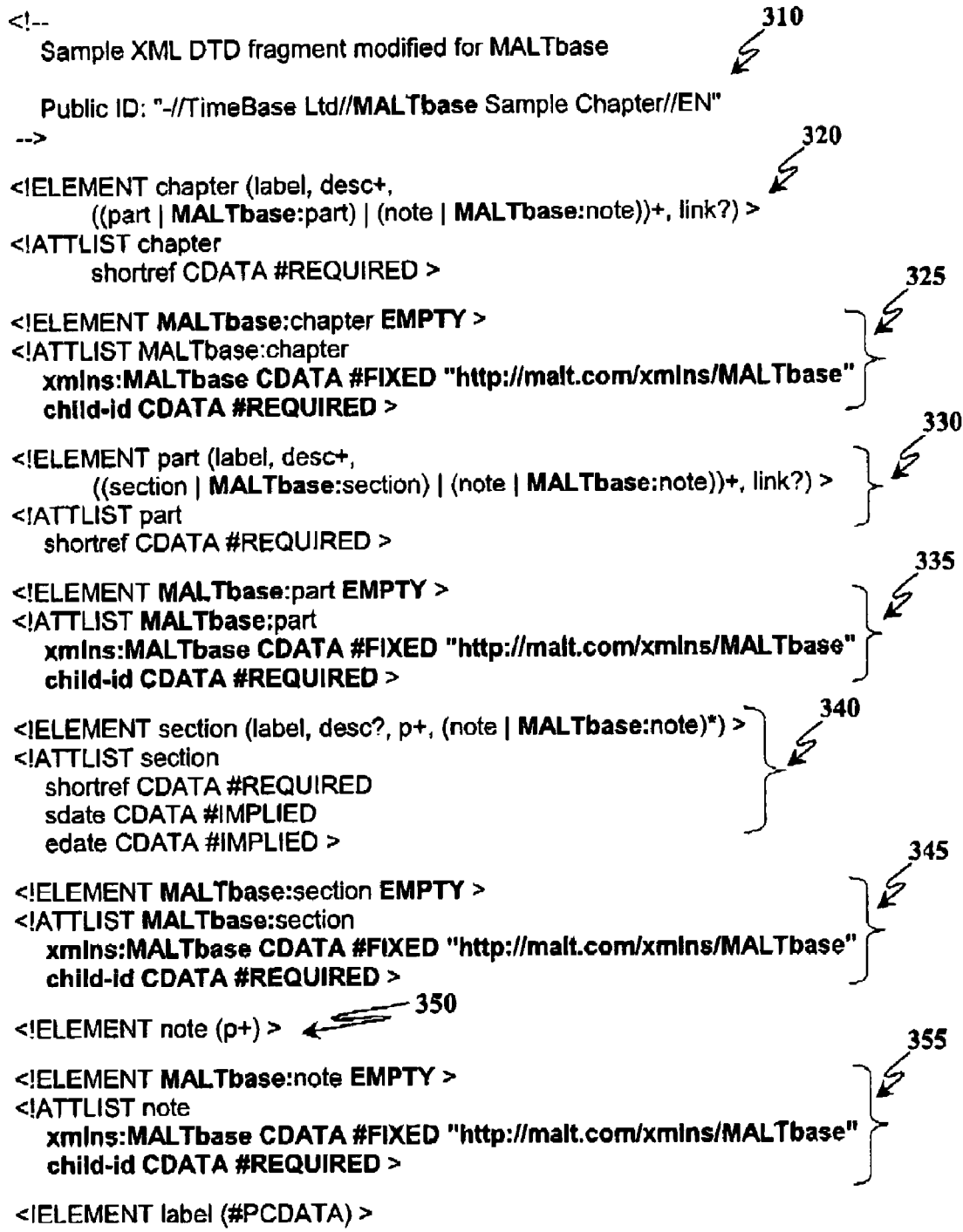
FIG. 3 shows a MALTbase DTD fragment corresponding to the DTD fragment of FIG. 2.

A method, an apparatus and a computer program product for converting a markup language document into an equivalent database table are described. Preferably, the markup language is XML and the database is a SQL database. in the following description, numerous details are set forth. It will be apparent to one skilled in the art, however, that the present invention may be practised without these specific details. In other instances, well-known features are not described in detail so as not to obscure the present invention. While the following description refers to an XML document, the principles embodied therein can readily be extended to encompass arbitrary collections of XML documents.

Where reference is made in any one or more of the accompanying drawings to steps and/or features, which have the same reference numerals, those steps and/or features have for the purposes of this description the same function(s) or operation(s), unless the contrary intention appears.

XML to SQL Conversion

A method of conversion is disclosed for producing an SQL rendition of an XML document that preserves document order, hierarchy, and all other links and relationships. Such a method of conversion preferably limits the number of tables and records and the amount of real time processing required by downstream applications to the minimum consistent with the required functionality. The method converts an XML encoded document into a minimal set of SQL tables in such a manner that the original XML document may be reconstructed in full at any time. This methodology is referred to as "MALTbase" hereinafter.

The MALTbase mapping operates on any arbitrary XML document with an arbitrary Document Type Definition (DTD) or schema. DTDs and XML schemas are different mechanisms that are used to specify valid elements that may occur in a document and the order in which such elements may occur. DTDs and schemas may also constrain certain aspects of the elements.

In the embodiments of the invention, the granularity of the conversion of an XML document to an SQL table is matched to the requirements of those applications that access the SQL output. Accordingly, the large scale structure of the data is mapped into a set of nodes. Structure below this level is simply broken into sub-documents which are stored as a single field or Character Large OBject (CLOB). The sub-documents in single field or CLOB format are suitable for direct use by end applications, including:

XML validating editors used to examine, modify, or both examine and modify the data; and any other application needing to access the data on a node-by-node basis.

The fundamental underlying principle of the conversion strategy, and what sets the strategy apart from other XML to SQL conversion systems, is the concept of strictly operating at a node level, rather than operating on every single element of the document to be converted. A node is a distinguished structural unit of the document. Typically, a node is introduced by one of a set of specified XML elements (the node element set). The MALTbase mapping converts an XML document into a single table of a relational database, the table possessing a single column for storing the content associated with each node identified. The MALTbase mapping involves decomposing the original XML document into a number of sub-documents, each sub-document corresponding to a node of the original XML document. The sub-documents contain placeholders that point to other node sub-documents in the node ordering. If the sub-document corresponds to a terminal node, the sub-document contains the content of the node from the original XML document.

MALTbase maps the content of the XML document into a relational database and is capable of performing operations on the converted content. The MALTbase conversion strategy is strictly defined, and includes the following steps:

1. Ascertain the optimal node element set for a hierarchical structure of a markup language document;
2. Assign a unique ID to each node;
3. Create a MALTbase DTD through which the converted nodes maybe accessed;
4. Convert content as specified hereinafter by decomposing each node in the markup language document into an independent sub-document; and
5. Construct a node table to hold the content.

As a result of the MALTbase conversion, content from the original XML document is contained in a single text field or a Character Large OBject (CLOB) in a single SQL nodes table. A single MALTbase implementation maps any XML document into the same number of tables every time, irrespective of the size or complexity of the document being mapped.

1. Establish a Node Element Set

The first step of MALTbase typically involves selecting the obvious key elements of the hierarchical structure present in the XML document that is to be converted. For example, a document representing an Act of legislation might be broken into a node element set consisting of the node element names: act, chapter, part, division, section, schedule and item. Similarly, a case report might have an associated node element set consisting of the node element names: report, headnote, judgment, paragraph and order.

The choice of the smallest element in the node element set is dependent upon how the data is maintained and accessed. For optimum utility, it is prudent to include elements down to a level that is appropriate to be dealt with by a single editor. Thus, a sub-sub-paragraph may be a poor choice as this element is at a low level of a typical hierarchy for a document. An editor would likely want to deal with many sub-sub-paragraphs at a time. Similarly, choosing a chapter as the lowest element of the hierarchy in the node element set may be less than ideal as a number of editors would likely wish to make changes to the same chapter contemporaneously.

FIG. 1 shows a sample fragment of an XML document. Each XML document has exactly one root node, corresponding to content outside of the highest element of a node element set. The hierarchical structure present in the XML fragment might be represented by a node element set consisting of the node element names: chapter, part, section and note. A node is a portion of text corresponding to one of these node elements for the XML document. That is, the node is an instance of one of the node elements Accordingly, the "part" identified in FIG. 1 as <part shortref="Ch 3, Pt A"> is a node that has three sub-nodes: sections 56 and 56A and a note.

2. Node IDs

Each identified node in the XML document in turn requires a MALTbase identifier for further processing. A MALTbase node ID is constructed of a set of segments demarcated by a "/", so that the ID of a sub-node contains the ID of the sub-node's parent as a prefix. Again, every XML document has exactly one root node, the root node always has a NULL node ID, and the content of the root node is trivial if the main document element is itself a node (which is typically the case). Thus, if the parent ID is /8/50/2/4, then a sub-node's ID might be /8/50/2/4/7. The final segment, "7", is called the child ID of the sub-node.

The segments reflect the order of the sub-nodes within each parent node. These strings are ordered, so a sub-node inserted between child IDs '6' and '7' might have child ID '6.5'. For example, a new intermediate child ID may be identified by a real number between the ID values of the upper and lower adjoining nodes in the node ordering. Other variations on this principle of generating intermediate node ID values may be practised without departing from the scope and spirit of the invention.

3. DTD Transform

An XML document must be valid in relation to a DTD (or Schema—the logic is identical) for the original XML document to be maintained in a MALTbase system. In relation to the content of the original XML document, the content of each sub-node in the original XML document is transferred to an independent sub-document. Modifications to the DTD are required to handle the MALTbase nodes. Every reference to the node in the DTD is (optionally) replaced by a placeholder. In the XML document, a placeholder replaces the content of a sub-node moved into the independent sub-document with a pointer to the respective independent sub-document containing the relevant sub-node.

In further detail, the DTD transformation thus has three stages:

(i) defining placeholders;

(ii) expanding content model; and (iii) defining a public identifier for the MALTbase DTD.

If the node element set is supplied, the transformation may be applied automatically. Where a DTD contains fragments referenced via an XML entity, either the whole DTD can be expanded into a single document by replacing the entity reference with the equivalent text in the DTD and then applying the transformation to the whole DTD, or the additional files making up the DTD can be transformed separately and the entities redefined to point to the modified entities making up the transformed DTD.

Although technical descriptions in this document relate to DTDs, the principles described can readily be applied to XML Schemas and other markup language formal to definitions for markup rules.

The MALTbase Namespace

To transform an XML document into more manageable sub-documents, unique element names must be generated for the node element set. Extra elements must be inserted in the sub-documents to replace existing element names. It is vital that the new is element names do not clash with names already in use. Fortunately, XML provides a means of doing this safely and efficiently.

The XML Namespace standard (http://www.w3.org/TR/REC-xml-names) provides a mechanism for defining a distinct namespace in which the new elements can reside. This is achieved by inserting an identifying prefix and a colon separator before the existing element name, thus:

<MALTbase: chapter . . . />.

This element is completely distinct from the ordinary "chapter" element shown as a substring in the new element name, and can have different content model and/or attributes. To ensure uniqueness, the namespace must have a distinct Uniform Resource Identifier (URI). This is done by adding a fixed attribute to the element definition of each MALTbase element included in the node set:

```
<!ATTLIST MALTbase:chapter
    xmlns:MALTbase CDATA #FIXED "http://malt.com/
    xmlns/MALTbase"
    ...
>
```

In this way, each MALTbase element name or tag cares a corresponding namespace definition at all times. The word 'MALTbase' and the namespace 'MALTbase:' can be replaced by any suitable word and namespace.

The namespace URI does not have to contain any particular data. In fact the namespace URI need not exist. It is merely a convenient way of assigning a label that is guaranteed to be unique across the internet. Other methods of generating unique element names may be practised without departing from the scope and spirit of the invention. For example, a long string of irregular characters may be inserted as a prefix to existing element names in the expectation that no such corresponding element names do or will exist.

Placeholder Definition

The DTD is modified by defining a placeholder element for each node element in the XML document and the DTD so that content associated with each node can be moved to an independent sub-document. A placeholder is provided in accordance with a strict protocol and acts as a pointer in the separate sub-document to the separate sub-document in which the node's content now resides. The less information that a placeholder contains, the greater the flexibility that is provided. Accordingly, the preferred embodiment of a placeholder has exactly two attributes. The first attribute is the placeholder's namespace definition, which is fixed to a predefined value. In fact, placeholders do not explicitly carry this attribute in the sub-documents, but rather rely on this fixed value. The second attribute is a "child-id", which is a string that sorts lexically to define the placeholder's document order with respect to other placeholders in the same parent node.

For example, consider a chapter from an original DTD that is defined as:

```
<!ELEMENT chapter (intro, (part+ | section+), link?)>
<!ATTLIST chapter
    id    CDATA    #REQUIRED
    new-page (yes|no) "no">
```

A placeholder has the same element name as the original element name ("chapter"), except the placeholder's element name resides in the MALTbase namespace. Accordingly, "MALTbase," is inserted as a prefix to the element name "chapter" to form "MALTbase:chapter". A placeholder always has EMPTY content. An empty element is an element that does not contain further elements or data or text. A placeholder is an empty element.

Continuing the example, the following chapter placeholder needs to be defined in the modified DTD:

```
<!ELEMENT MALTbase:chapter EMPTY>
<!ATTLIST MALTbase:chapter
    xmlns:MALTbase
        CDATA #FIXED "http://www.malt.com/xmlns/MALTbase"
    child-id
        CDATA #REQUIRED>
```

The element name ("chapter") is the only thing passed from the original element to the placeholder. All placeholder definitions are otherwise identical.

Content Model Expansion

To ensure that a placeholder can always be validly substituted for the original element that the placeholder replaced (and vice versa), the modified DTD must have the following property:

In every content model, every occurrence of an element in the node element set must be replaced with an expansion for that element and the corresponding placeholder, as alternatives (i.e., an alternation).

Continuing the above example of the chapter, wherever chapter appears in the original DTD, the modified DTD allows a chapter OR a MALTbase:chapter. For example, the act definition in the original DTD:

```
<!ELEMENT act (longtitle,
    (chapter+ | part+ | section+),
    schedule*)>
``` is replaced in the modified DTD as follows:

```
<!ELEMENT act (longtitle,
    ((chapter|MALTbase:chapter)+ |
    (part|MALTbase:part)+ |
    (section|MALTbase:section)+),
    (schedule|MALTbase:schedule)*)>
```

The node element "chapter" from the original DTD is replaced with "(chapter |MALTbase:chapter)", for example, where "|" is an "OR" or disjunctive logical operator for alternatives. The same principle applies for other node elements. The references to "act" and "longtitle" are unchanged. This is because longtitle was not included in the node element set, and act (in this instance) is not part of the content model. The definition of any parameter entity included in a content model must be similarly modified.

Public Identifier

The transformed DTD needs a modified public identifier to differentiate the modified DTD from the original DTD. A simple way to achieve this is to add the word "MALTbase" to the beginning of the descriptive part of the ID. If the original DTD has a public ID:

PUBLIC "-//XYZ Pty Ltd//Sample DTD//EN"then the modified DTD has public ID.

PUBLIC "-//XYZ Pty Ltd//MALTbase Sample DTD// EN"

The above points are illustrated in the following example. The original DTD fragment:

```
<!ELEMENT chapter (label, desc+, (part | note)+)>
<!ATTLIST chapter
    shortref CDATA #REQUIRED>
``` becomes:

```
<!ELEMENT chapter (label, desc+,
    ((MALTbase:part | part) | (MALTbase:note | note))*)>
<!ATTLIST chapter
    shortref CDATA #REQUIRED>
<!ELEMENT MALTbase:chapter EMPTY>
<!ATTLIST MALTbase:chapter
    child-id CDATA #REQUIRED
xmlns:MALTbase CDATA #FIXED "http://malt.com/xmlns/MALTbase"
>.
```

The foregoing shows that not all elements (e.g., "desc") need have a placeholder In this example, "desc" and "label" are elements of the DTD, but are not in the node element set.

FIG. 2 shows an original DTD fragment 200 for the XML fragment of FIG. 1. The DTD fragment 200 contains a public ID 210 and element declarations 220, 230, 240, 250 and 260 for a chapter, part, section, note and desc, respectively. FIG. 3 shows a MALTbase version 300 of the DTD fragment of FIG. 2. In FIG. 3, the public ID 310 has evidently been modified to incorporate the word MALTbase as a prefix to the descriptor. FIG. 3 also shows the inclusion of a new element with empty content for each node element in the node element set of the document being converted. Thus, the element declaration 320 for a chapter has a corresponding element declaration 325 for a MALTbase:chapter. There are also new element declarations 335, 345 and 355 for MALTbase:part, MALTbase:section and MALTbase:note, respectively.

DTD TRANSFORMATION EXAMPLE

FIG. 4a shows a simple DTD. The DTD is shown in the form as the DTD would be supplied by a user. The node element set for the original DTD shown in FIG. 4a consists of (level-1, level-2, level-3).

FIG. 4b shows a modified DTD corresponding to the original DTD of FIG. 4a. Placeholder elements 410, 420, 430 have been inserted. The public id 440 has been modified to incorporate "MALTbase". The content models have been modified such that there is an alternation between the original node elements and the modified node elements, as shown by 450 and 460. Even though level-1 does not appear in any content model, level-1 requires a placeholder so that it may appear in the root node if necessary.

4. Document Transform

After establishing a node element set and modifying the DTD, it is necessary to decompose the original XML document into individual sub-documents corresponding to the individual nodes. Each sub-document must conform to the new DTD. The content of each node takes the form of a discrete sub-document where:

- the DOCTYPE element of the sub-document is the node element;
- a Document Type Definition (DTD) that defines the set of rules for document construction has a public ID identical to that of the original DTD associated with the XML document being converted, except that the word MALTbase is inserted as a prefix to the description to create a new DTD with a PUBLIC identifier that is distinct, but readily derivable from the ID of the original DTD; and
- the full text of each sub-node is replaced by an empty element, which has a "MALTbase:" namespace prefix added to the sub-node element's name to distinguish the new MALTbase elements from their original counterparts, which can co-exist in a single document when new nodes are created.

The pre-processing of MALTbase node content is strictly defined to ensure that the conversion is reversible. The conversion must allow the node content to be accessed and/or modified by standard validating XML editing tools.

The easiest way to describe the decomposition process is by specifying a set of steps which perform the required transformations. It is important to note, however, that decomposition software need not follow these steps exactly. The software is simply required to produce the same end result as the steps below, regardless of how it is implemented internally. The steps required for this conversion are as follows:

1. In the XML document, assemble the XML content of the nodes. This may involve expanding entity references to other original XML files, but only when such references lie directly within the node in question (i.e. not within any sub-node). Some of the content of a node may be stored in a separate file, which is represented in the main document by a file entity reference. These references must be replaced by the expanded XML markup and content that the references represent to get the complete content of a node. However, since the content of any sub-node is not part of a node, such references need not be expanded when the references lie within sub-nodes. Those references are expanded when the sub-node is being processed.

2. Create a standalone sub-document for each node of the original XML document by inserting as a prefix the standard XML processing instruction, plus a DOCTYPE declaration, where the DOCTYPE element is the node element, and the public ID is the same as that of the original DTD, except that the word MALTbase is inserted as a prefix to the descriptor.

For example, if the original XML document begins:
<?xml version="1.0"?>
<!DOCTYPE document PUBLIC "-//TimeBase//DTD Sample//EN">then the converted "sub-document" for a chapter node begins:
<?xml version="1.0"?>
<!DOCTYPE chapter PUBLIC "-//TimeBase//MALTbase DTD Sample//EN">

3. Each node becomes a separate sub-document, while all sub-node elements are replaced by a MALTbase: placeholder.

4. Replace any sub-node elements in the sub-documents with equivalent placeholders in which the namespace MALTbase: has been inserted as a prefix to the element name, and the only attribute explicit in the XML data is the child ID (the ID of the sub-node relative to all the other subnodes within the subnode's parent). The additional xmlns:MALTbase attribute, defined in the transformed DTD as a #Fixed attribute, establishes a namespace that ensures that the new MALTbase; elements that are being inserted are unique and do not clash with any existing element. The element names must be unique to ensure that MALTbase is able to operate on any arbitrary XML document. So, if the part element also belongs to the node element set, then the internal fragment:

<part shortref="Ch 3, Pt A">. . . </part>is replaced by:
<MALTbase:part child-id="80"/>

This enables sub-nodes to be abstracted. Thus, generally, one editor can operate on a part, and another editor can operate on a section within that part without conflict. Accordingly, the original document can be divided into discrete chunks in such a way that if the integrity of each chunk is maintained then the integrity of the entire document is guaranteed. This is a powerful concept, since the need is removed to reverify a (potentially vast) document every time a chunk is changed.

The Root Node

Every document has exactly one root node. While every other node is associated with a single element in the node element set, the root node corresponds to the document as a whole. It is here that any XML content outside the outermost node(s) is kept. Where the DOCTYPE element is also a node element, the moot node is trivial. For example, the document:

<?xml version="1.0"?>
<!DOCTYPE act
    PUBLIC "-//XYZ Pty Ltd//Sample Document//EN">
<!-- a boring root node -->

-continued

```
        <act year="1989" number="109">
            <longtitle . . .>
            <chapter . . .>
            . . .
        </act>
``` has the root node:

```
<?xml version="1.0"?>
<!DOCTYPE MALTbase:act
    PUBLIC "-//XYZ Pty Ltd//MALTbase Sample Document//EN">
<!-- a boring root node -->
<MALTbase:act child-id="1"/>
```

When the DOCTYPE element is itself a node, it is replaced by a MALTbase placeholder in the root node, and the DOCTYPE is altered accordingly.

However, when the DOCTYPE element is not a node, such as:

```
<?xml version="1.0"?>
<!DOCTYPE act-group
    PUBLIC "-//XYZ Pty Ltd//Sample Document//EN">
<!-- a non-trivial root node -->
<act-group type="amending">
    <act year="1992" number="67"> . . . </act>
    <note><p> . . . </p></note>
    <act year="1992" number="121"> . . . </act>
    <act year="1992" number="213"> . . . </act>
    . . .
</act-group>
``` then the root node is not as trivial:

```
<?xml version="1.0"?>
<!DOCTYPE act-group
    PUBLIC "-//XYZ Pty Ltd//MALTbase Sample Document//EN">
<!-- a non-trivial root node -->
<act-group type="amending">
    <MALTbase:act child-id="1"/>
    <note><p> . . . </p></note>
    <MALTbase:act child-id="2"/>
    <MALTbase:act child-id="3"/>
    . . .
</act-group>
```

Note that the act-group element (not being a node) does not need to change, and so neither does the DOCTYPE. It is in such a case that the advantage of having a single unique root node to hold material outside the outermost node elements becomes obvious. In particular this strategy ensures that there is a single node tree root even if there are several outermost node elements.

FIGS. 5a to 5c show the explicit conversion of the root node and two other nodes from the XML document of FIG. 1. The root node is always present, and contains the document down to the outermost node(s). The user defining the node element set decides whether to include the DOCTYPE element in that node element set. Typically, the DOCTYPE element is included in the node element set and is the outermost node corresponding to the highest level of the hierarchical structure of the document being transformed.

In FIG. 5a, the root node of FIG. 1 has been converted to a MALTbase representation. In particular, the DOCTYPE declaration has been amended such that the DOCTYPE element "chapter" is now "MALTbase:chapter". The chapter sub-node is moved into a separate node document. For each node other than a terminal or leaf node, each MALTbase: element is effectively a sub-node placeholder that refers to a document that contains the sub-node. Terminal or leaf nodes do not contain placeholders, but instead have actual content from the original XML document. The root node of any XML document is not the principal DOCTYPE element, but a nameless node which contains all of the document outside the principal element. The principal element is the element corresponding to the highest level of the hierarchy of the XML document under consideration. The root node is typically trivial, unless the principal element is not itself a node. In the latter case, the root node may have some content from the original XML document.

Consider a document with DOCTYPE legislation, and a legislation element containing a number of acts. If an act was the highest node in the hierarchy, then the root node contains the legislation element unchanged, with MALTbase:act placeholders for each contained act. Such an example may be atypical, but importantly MALTbase must be able to handle all possibilities that might arise in arbitrary XML.

The descriptor

PUBLIC "-//TimeBase Ltd //MALTbase DTD Sample Chapter//EN" replaces the original descriptor PUBLIC "-//TimeBase Ltd//DTD Sample Chapter//EN" to differentiate the new DTD from the original DTD.

The sub-node element is indicated by the expression

<MALTbase:chapter child-id="3"/>

FIG. 5b shows the converted MALTbase representation of Chapter 3 from FIG. 1. The MALTbase representation indicates that the DOCTYPE is a chapter and the word "MALbase" has been added to the public identifier.

FIG. 1 shows that Chapter 3 consists of Part A and Part B. Accordingly, FIG. 5b shows the sub-node elements <MALTbase:part child-id="1"/> and <MALTbase:part child-id="2"/>. The MALTbase representation of Chapter 3 concludes with the "link" line and the delimiter </chapter>, The child IDs shown above are purely arbitrary and are always assigned by the system, never by an end user.

Similarly, FIG. 5c shows the MALTbase representation of Part A of Chapter 3 from FIG. 1. The DOCTYPE declaration line indicates that the DOCTYPE is a part, and the word "MALTbase" has been inserted into the public identifier.

FIG. 1 indicates that Part A has two sections and an associated note. Accordingly, three sub-node elements are provided in the MALTbase representation of Part A shown in FIG. 5c.

Decomposition Example

FIG. 6a shows a simple XML document conforming to the DTD of FIG. 4a. FIGS. 6b to 6f show the decomposition of the document shown in FIG. 6a. FIG. 6b shows a resultant root node derived from the original document of FIG. 6a Since the DOCTYPE element is a node, the resultant root node 610 is trivial, containing in effect only the initial comment. The root node 610 is the only node which may have a place holder as the DOCTYPE element.

FIG. 6c shows a classical higher level node 620 corresponding to the level-1 "Papa" node of FIG. 6a. As can be seen from FIG. 6c, all of the sub-node content (attributes, sub-elements, text) has been removed to an appropriate sub-document. This allows two users to edit the "papa" and level 2 "mama" nodes contemporaneously without the possibility of clashing. The content of each node is completely self-sufficient, except that a parent node refers indirectly to the parent node's children via placeholders. It may be noted that the deletion of the level-3 sub-node "baby" does not affect the level-1 "papa" node at all.

FIG. 6d shows the level-2 "mama" node of the document of FIG. 6a. The "mama" node 630 has substantive content appearing either side of the level-3 child "baby" node.

FIG. 6e shows the level-3 "baby" node 640 of the document of FIG. 6a. The "baby" node 640 is a typical terminal node that has no children. Accordingly, this branch of the decomposition process is complete.

FIG. 6f shows the level-2 "goldilocks" node 650 of the document of FIG. 6a. The "goldilocks" node 650 is another terminal node and is structurally identical to the "baby" node 640 of FIG. 6e.

The total number of nodes and hence the total number of sub-documents produced by the decomposition process is N+1, where N is the total number of occurrences of elements in the node elements set. The extra node is the root node. For each node there is exactly one sub-document and vice versa. The node element of a sub-document will be its DOCTYPE element. The DOCTYPE element of the root node will be the DOCTYPE element of the whole document (if that is not itself a node element) or a placeholder (if the master DOCTYPE element is a node element).

Each node "knows" nothing about the node's descendants, except for the identity and placement (but not the content) of the node's immediate children. While information about the ancestors of the node is not contained within the node's XML content, the parent ID of the node does give the identity (but not the type or content) of each of the ancestors of the node.

It is now possible to construct the first record of the SQL database, where both the parent ID and child ID are NULL, and the content is the root node XML described above.

5. Basic SQL Table Structure

In principle, any document can be mapped to a single SQL table. In practice, additional fields and/or tables may be desired to facilitate particular types of searching or other operations that are to be performed on the data. All such variants are logical extensions of the simple table defined below.

Having created a number of sub-documents corresponding to each node, a SQL table must be established to allow the nodes to be stored and retrieved as desired. This table must include the following fields:

a child_id—the child ID of the node being stored (information that corresponds to the node's relative position within the node's immediate parent);

parent_id—the ID of the current node's immediate parent in the hierarchy (NULL for the root node); and content—the text of the sub-document corresponding to the current node. Other fields may exist optionally in the table to expedite searching (e.g. a node_tag field to store the node element name: chapter, part, etc; or a short_ref field to enable searching for nodes via the contents of a short_ref attribute).

The Node Hierarchy

The nodes of a document, like any other XML elements, form a strict hierarchy. At the top of the node tree is the root node, which corresponds to the document as a whole. The remaining nodes are in one-to-one correspondence with the node elements in the document. The hierarchy corresponds similarly. If element B is contained within element A, and no other node elements come between them, then node B lies directly below node A in the hierarchy. In other words, node A is the parent of node B.

The Child ID

The child ID is a value which conveys the position of a node with respect to its siblings (ie. other nodes with the same parent). Each child of the same parent must therefore have a unique child ID. A helpful analogy is to regard the child ID as a decimal number. When a document is first converted, the first child of each parent node will be assigned child ID "1", the next "2" and so on. If at some later time a new node is inserted between "1" and "2" then an ID such as "1.5" may be used. The exact values are unimportant, though it is desirable that the creation of extra "decimal places" be avoided where possible. The only guarantee is that: the child ID of a sibling occurring earlier in the document will always be less than the child ID of a sibling occurring later in the document. Note that child IDs may not necessarily be represented internally as decimal values, but they will always sort in the correct order.

The Node ID

The node ID is a string which uniquely identifies both the node and its position in the document. It consists of the ordered set of child IDs of each of the node's ancestors. By convention, each ID is preceded by a "/" character (though once again the internal representation might differ somewhat to facilitate sorting). Table 1 illustrates a possible set of node IDs.

TABLE 1

| Description | parent ID | child ID | full ID |
| --- | --- | --- | --- |
| root node | NULL | NULL | / |
| Crimes Act | / | 27 | /27 |
| Chapter 3A | /27 | 3.5 | /27/3.5 |
| section 67 | /27/3.5 | 8 | /27/3.5/8 |

As is evident from Table 1, the parent ID of any node is the full ID of that node's parent, and the full ID of a node is the concatenation of the node's parent ID and child ID. Neither the parent ID nor the child ID of a node need be present in the node content. However, the child ID of a node is present in the content of that node's parent, as the child-id attribute of the corresponding placeholder.

The Basic Nodes Table

The nodes table holds one node per record, and requires only three fields; parent_id, child_id and content. The content field is a (possibly quite large) text field or a Character Large OBject (CLOB) containing the converted node XML, or a unique pointer to that text in the sub-documents created during the document decomposition. To speed queries and updates it may be useful to include extra fields or even whole tables. Such additional extra fields and tables may include: XML context, unique and unalterable serial number, or an ancestry table.

FIG. 7 shows a minimal SQL node table 70 corresponding to the document fragment of FIG. 1. Each row in the node table 70 corresponds to a node. Each node has an associated child_id 72, a parent_id 74 and a content field 76. The content field 76 is a text string containing the MALTbase version of the relevant XML element. These strings may be quite large, but a suitable choice of the node element set will ensure that they are sized appropriately fox a particular application.

Row 77 corresponds to the mapped content of the root node of FIG. 1, as described above with reference to FIG. 5*a*. The root node has a NULL child_id and a NULL parent_id. The content_field 76 associated with the root node contains the text "root node". Row 78 corresponds to the mapped content of the chapter node of FIG. 1, as described above with reference to FIG. 5*b*. The chapter node has an arbitrarily assigned child_id 72 of "3" and a parent_id 74 of "NULL". Row 79 corresponds to the mapped content of the first part node of FIG. 1, as described above with reference to FIG. 5*c*. The first part node has a child_id 72 of "1" and a parent_id 74 of "/3".

The node table 70 may in practice be augmented with extra fields to facilitate searching. Such additional fields may include XML element path or shortref. Similarly, a full ancestry table may be provided if rapid navigation through the hierarchy is a priority. Finally, the database technique of record locking can be simplified if each record is assigned a unique, unchangeable serial number (unrelated to document order). A serial number does not change when, for example, two nodes are swapped. Record locking is the database facility which enables one user to update a record, and prevents any other user from attempting to update the same record until the first user is finished.

Sub-Node Handling

Having constructed a root node, new sub-documents are constructed to hold the content of each sub-node element. These sub-documents will be valid against the modified DTD, and have the DOCTYPE set to the sub-node element. Thus for the trivial root node example above, the sole sub-node content will be:

```
<?xml version="1.0"?>
<!DOCTYPE act
    PUBLIC "-//XYZ Pty Ltd//MALTbase Sample Document//EN">
<act year="1989" number="109">
    <longtitle . . .>
    <chapter child-id="1"/>
    . . .
</act>
```

After root node processing, it is guaranteed that there will be exactly one outermost node per sub-document, which will always be the DOCTYPE node. The next step is to search the DOCTYPE node for sub-nodes. For each sub-node in the DOCTYPE node, insert a corresponding placeholder and construct a new sub-document. The original sub-document now looks like:

```
<?xml version="1.0"?>
<!DOCTYPE act
    PUBLIC "-//XYZ Pty Ltd//MALTbase Sample Document//EN">
<act year="1989" number="109">
    <longtitle . . .>
    <MALTbase:chapter child-id="1"/>
    . . .
</act>
```

It is possible to create a new database record in which the parent ID is the full ID of the parent node ("/" if the parent is the root node), the child ID matches the child-ID of the placeholder which replaced this node in the parent's content, and the content is the content of the node after sub-node substitution.

This step is repeated for the new sub-document(s), and is reiterated until no sub-document contains more than one node element. At such a point, the decomposition is complete.

FIG. 8 shows a sample node table 800 arising from the decomposition shown in FIGS. 6*a* to 6*f*. Row 810 corresponds to the root node 610 of FIG. 6*b*. The root node has a parent id of "NULL" and a child id of "NULL". Row 820 corresponds to the "papa" node 620 of FIG. 6*c*, having a parent id of "/" and a child id of 1. The child id of 1 indicates that the "papa" node is the first child of the root node 610. Row 830 corresponds to "mama" node 630 of FIG. 6*d*, that has a parent id of "/1" and a child id of "1". Similarly, row 840 corresponds to "baby" node 640 of FIG. 6*e* that has a parent id of "/1/1/" and a child id of "1". Finally, row 850 corresponds to the terminal "goldilocks" node 650 of FIG. 6*f* that has a parent id of "/1" and a child id of "2". The child id of "2" indicates that the "goldilocks" node is the second child of the "papa" node 620. The child ID field must match the child ID attribute in the parent node.

Document Reconstruction

A method, an apparatus and a computer program product for reconverting a MALTbase SQL table set back into equivalent XML is described.

The process proceeds as follows:

1. Create an XML document from the root node (NULL parent_id) content in which the MALTbase prefixes are removed from DTD public ID and the DOCTYPE (if present).
2. Let the current node be initially set to the root node.
3. Establish the set of immediate children of the current node with a SQL command such as:

```
SELECT *
    FROM nodes
    WHERE parent_id = @current_node
    ORDER BY child_id
```

4. If no immediate children exist, the reconstruction of the current node is complete.
5. Otherwise, for each child node, replace the corresponding MALTbase (empty) sub-node element with the reconstructed content of the node, which is obtained by:
    isolating the sub-node element data (i.e. removing the XML instruction, DOCTYPE, and xlmns:MALTbase attribute from the content field);
    setting the current node to be the sub-node;
    recursively applying steps 3 to 5 until all descendant nodes have been reconverted.

The end result of this process is a monolithic XML document that contains the same content as the original document (of course, incorporating any changes made while the document was in SQL form).

If the original document was split over a number of files (for example using file entity references), a requirement of the reconversion may be that the original file structure also be recovered. This can be achieved by inserting appropriate processing instructions, such as:

<?MALTbase entity="&ch3-ptA;" file=". . ./ch3/ptA.xml" ?> during the initial conversion and using these embedded codes to redirect the reconstructed nodes to the appropriate output file.

SQL Document Access/Maintenance

The decomposition of a large XML document into independent smaller sub-documents is simply a means to an end. It is important to be able to access and modify the information in these sub-documents. A method, an apparatus and a computer program product for maintaining an XML document in MALTbase SQL form, without the need for reconverting the document to XML, are described.

A primary use of MALTbase is to store complex XML documents within SQL databases. In general, the node element set is chosen so that each node represents a reasonable portion of the data to retrieve or maintain. Since the converted node content is already in the form of a standalone XML document, any standard XML author/editing tool can be used to examine or modify the content.

MALTbase allows five basic node operations:
modify an existing node
insert a new node (or sub-tree)
delete an existing node (or sub-tree)
copy an existing node (or sub-tree) to a new location
relocate placeholders within a node In particular, if this standard XML author/editing tool supports an interface with an SQL Application Programming Interface (API), an editing session consists of the following steps:
locate the node to be edited (all editing is on a per node basis);
activate an edit function which:
locks the node for writing; and
establishes an edit session in which the editing tool manages the node content; and
when the edit session is finished, the updated content is written back into the node record.

Modify an Existing Node

Simple modification involves a change to a node which does not affect:
the node's DOCTYPE element
any element in the node element set
any placeholder This operation is the most staightforward. Simply open the node, update the content, and save. The modify operation is the only operation performed on the target node itself. All other operations are performed on the parent of the node being inserted, deleted, etc.

Insert a New Node

To insert a new node, first open the parent of the node to be created. The parent node will have to contain a placeholder for the new node. However, a placeholder cannot be created directly, as placeholder management is a MALTbase system function. Further, there is no current node to which a placeholder can point.

A solution is to enter the new material in situ, just as if editing the original document. For example, to create a new section in an act, open the act and simply key in the new section in the desired location. Use <section> elements and not <MALTbase:section/> in this procedure. Inside the section element, key the content normally. Node elements may be included in this content, where permitted by the DTD. When all the new material has been keyed, save the edited node.

At this point, the MALTbase system takes over. MALTbase routinely examines all updated nodes before saving the updated nodes. If MALTbase detects any node elements within a node, MALTbase will automatically decompose the node elements into as many new sub-nodes as are required, and replace the outermost sub-node with a placeholder In effect, this is exactly the same process as was used to convert the original document, only limited to the content of a single node. This process cannot affect the validity of the master document, as the editing application will have validated the modified node prior to saving.

Delete an Existing Node

To delete a node, edit the node's parent and delete the appropriate placeholder. The editing application will ensure that such a deletion is valid. When saving the edited parent, the MALTbase system compares the list of child IDs with a list prepared by the system when the parent node was opened. If any placeholders are missing, then the corresponding nodes (and any descendants) are deleted from the system. In this way, the validity of the whole document is maintained provided the validity of each individual node is preserved.

Copy an Existing Node

To copy a node, the node ID of the node to be copied must be known. Edit the node that will be the parent of the new copy, and insert a placeholder with an element name and child-id set to the ID of the node to be copied. If the node to be copied is not already a child of the parent, the full child ID is used, rather than just the final segment. The editing application will ensure that such an insertion is valid. When saving the edited parent, the MALTbase system will locate the nodes which have been amended in this way. A duplicate node will be created with identical content to the original, but with a parent ID set to the parent node that was edited. Any descendants will also be copied and be assigned new Ids, as appropriate, based on the parent ID and order amongst the node's existing child nodes.

Note that the child-id entered on the new placeholder must be a valid ID for an existing node somewhere in the master document.

It is not possible to create new nodes using this technique. Either an absolute or relative ID may be used. An absolute ID begins with "/" and gives a fall path down from the root node, whereas a relative ID begins with "./" and relates the child to the current parent. Absolute IDs are typically used except where the node to be copied is already a child of the new parent. The presence of the slash character in the child-id tells the system that an existing child node is not simply being relocated. Whatever form of child-id is used, the copy will be assigned a new regular child ID and the placeholders will be altered to reflect this.

Relocate Child Nodes within a Parent

It is possible to move existing placeholders to any valid location within a node being edited. This is a simple modification (see above) provided that the placeholders remain in the same order with respect to each other. However, if editing does affect the order of the placeholders, then a relocation operation will be triggered when saving the node.

As is the case for deletions, the system detects relocations by comparing a list of placeholders with a list of placeholders constructed before the editing session. The system assigns new child IDs to as many sub-nodes as necessary to ensure that the IDs once again correctly reflect the order of the child nodes within the parent node. These new IDs will also be applied to all descendants of affected nodes.

Database Operation Examples

FIGS. 9a to 9d illustrate the results of various database operations. FIG. 9a shows the result of a simple modifier operation, in which text is inserted into the level-2 "mama"

node. As the modification only affects the content of the node and no placeholders are affected, the new text is simply inserted.

FIG. 9b shows the result of a delete database operation. In this particular example, the level-3 child node is deleted and the "mama" node is now childless. The MALTbase system will automatically remove the deleted node when this "Mama" node is saved.

FIG. 9c shows the result of an insertion of a new level-2 node. The new level-2 node is inserted directly into the perspective parent node, in this case the level-1 "papa" node shown in FIG. 9c(1).

When the level-1 "papa" node is saved, a new node having an id of "/1/1.5" is created, as shown in FIG. 9c(2). The text inserted into the level-2 "papa" node is replaced by a placeholder, as shown in FIG. 9c(3).

FIG. 9d illustrates the relocation of existing placeholders. FIG. 9d(1) shows that the "mama" node has been moved and now appears after the "goldilocks" node. On being saved, the MALTbase system modifies the child ids of the sub-nodes of the level-1 "papa" node so that the child ids stay in ascending order. Accordingly, FIG. 9d(2) shows that the child-id of the "mama" node has been modified and is now "3".

Document Integrity

The chief value of the MALTbase system is that MALTbase guarantees that the whole master document will remain valid throughout any amount of editing and updating of the node sub-documents. In practice, this guarantee rests on three fundamental principles:
1. Each node document must at all times remain valid against the modified DTD;
2. The integrity of the interrelationships between the nodes, embodied in the database, must be preserved; and
3. The constraints which ensure the successful reassembly of the nodes into a master document must be honoured.

The following sections explain these principles in greater detail.

Node Validity

Clearly, if the individual node documents are compromised, there is no way that the integrity of the master document can be maintained, let alone guaranteed. Fortunately, any validating XML editor will take care of this, and the MALTbase system will immediately reject any attempt to save an invalid node document.

Database Integrity

This is a much more subtle requirement, and correspondingly harder to police. Part of the requirement is handled by the MALTbase system when it analyses the placeholders of incoming nodes. The system will reject any node which:
  has a placeholder referring to a non-existent node;
  has a placeholder whose element type does not match the corresponding node; or
  has duplicate placeholders, except for those with child Ds beginning with "/" or "./" (which imply a copy operation)

It should be noted that all of the above constraints can be violated by a "valid" node document. Since MALTbase allows many nodes to be edited simultaneously, it must also prevent inadvertent conflicts between these operations. This is done via the database locking mechanism.

A modern database will typically support both read and write locks at the record (i.e. node) level. A read lock prevents a node from being updated for the duration of the lock, but allows any number of simultaneous read operations. A write lock prevents any access to the locked record for the duration of the lock.

Thus, whenever a first user wishes to edit a node, the system attempts to obtain a write lock on that node. If another user is accessing the node, the attempt to lock will fail and the system will advise the first user that:

The node is currently locked by another user, please try again later. If the lock succeeds, the first user has exclusive access to the node during the editing session.

If a user aborts an editing session without saving, the system releases the lock and frees the node. However, if a user attempts to save the node, and assuming all placeholders are valid, the following actions occur:
  Simple Modify—the node content field is updated and the lock is released.
  Insertion—new nodes are created, and the parent node saved, in a single indivisible transaction after which all locks are released. If any part of the operation fails then the state of the database reverts back to what it was immediately prior to the edit session (a process known as rollback).
  Deletion—write locks are obtained on the node to be deleted, and all descendants of that node. The mass deletion and writeback of the original parent node form a single transaction.
  Copy—read locks are obtained on the node to be copied, and all descendants of that node. The mass copy, assignment of new IDs, and writeback of the target parent node form a single transaction.
  Relocation—write locks are obtained on all affected child nodes, and all descendants of that node. Assignment of new IDs, and writeback of the original parent node form a single transaction.

The important thing is that exclusive access to all the nodes being updated must be obtained before any part of the update can proceed. In this way, the linkage between placeholders and the corresponding node content is maintained and complex operations can proceed in parallel without threatening the integrity of the database.

The successful implementation of the method described above depends on two factors:
  the XML validity of the whole 'document' must be maintained; and
  the integrity of the database itself must be preserved, so that the various operations (modify, delete, move etc.) must be correctly interlocked with each other by means of suitable database locks and transactions.

The XML validity of the whole document is guaranteed because of the DTD transform through which individual node documents are created. Since each occurrence of a sub-node placeholder in a content model is paired precisely with an occurrence of the original element in that model, it follows that substituting a placeholder for a sub-node (or vice versa) has no effect on the validity of the whole. Thus, provided that a node document remains always valid and every sub-node marker corresponds to a real node document before saving the text in the database, a back conversion into XML always yields a valid document.

The second criterion, preserving database integrity, is a more complex matter and must be enforced by the use of appropriate relational database management system (RDBMS) mechanisms during the implementation. The first precaution is that a write (exclusive) lock must be obtained on a node record before an edit session may commence. This prevents any other user editing the node at the same time, but may leave both descendants and ancestor nodes free for editing (except if someone tries to delete a sub-tree which includes the node of interest).

Such considerations, however, are standard RDBMS practice and familiar to persons skilled in the art. The additional processes accompanying the write-back of a node into the database are of greater interest. To avoid potential confusion, the term principal node denotes the node that was modified and is being saved, and sub-node denotes one of the new or existing sub-nodes of the principal node. A placeholder is an empty MALTbase element that marks the location of a sub-node within the text of the principal node. The main steps involved in saving a modified principal node are as follows.

Generate a list of placeholders (if any) in the principal node. If any placeholder does not correspond with an actual database node, an error arises.

Generate a list of existing sub-nodes from the database, and pair off placeholders and sub-nodes.

If any sub-node is not matched against a placeholder, that sub-node and all the descendants of that sub-node are deleted from the database;

If any placeholder is not matched against a sub-node, either an existing sub-node is being duplicated, or a node elsewhere in the database is being copied.

Create the duplicate nodes (including descendants if any) and assign a provisional ID to each duplicate node. The ID consists of: the ID of the principal node, a provisional child ID within the principal node, and the trailing portion of the ID, if the new node is a descendant of the node being copied.

Scan the list of matched placeholders in document order. If any such placeholder has a lower child ID than one or more of its siblings already processed, assign a provisional child ID.

If there are any sub-node elements (as opposed to placeholders) present, perform a standard MALTbase XML-to-SQL conversion on each such element and create new SQL records for each. Assign a provisional ID to each new node, assigning a provisional child ID within the principal node. Replace the text of each sub-node element in the principal node with a new placeholder.

A principal node now exists in which each placeholder corresponds to a unique new or existing sub-node, and all with provisional child IDs (except for existing sub-nodes which retain the previous ordering). The final step is to assign permanent child IDs to the placeholders, replacing the provisional segment in the ID of each corresponding sub-node (or descendant). The new IDs are normally chosen to evenly fill the range between the previous existing child ID (or "0" if none) and the following existing child ID (or "fff . . . "), using as few hex digits as possible.

Additional Constraints

There are a few additional constraints required by a MALTbase system that are not directly related either to database integrity or sub-document validity. These constraints are required to ensure that the reverse transform (node set to single XML document) works properly.

The first requirement is that the DTD cannot be freely altered while the document is stored as a node set. If the DTD is to be changed, one of two things must happen:

1. The master document is reassembled prior to the change and the MALTbase to version reconstructed after the change; and 2. The whole database is locked for the duration of the change, and every sub-document successfully revalidated before the locks are released.

The second requirement is that the DOCTYPE element of a sub-document cannot be freely altered This is because, while the sub-document itself is validated by the XML editor, the new element type (amid hence the new element type's matching placeholder) may not be valid within the parent node's content. If such a change is required, it must be performed as follows:

1. Copy the content of the node to be modified to a temporary holding area;
2. Edit the parent, delete the corresponding placeholder, and insert the stored content in its place;
3. Modify the content to change the element type;
4. If the content contains placeholders of its own, the child-id attributes must be modified from CCC to ./NNN/CCC, where CCC is the current value of the attribute, and NNN is the child-id of the content being edited (i.e. the child-id of the placeholder removed in step 2); and
5. When the parent node is saved, the original child and the original child's descendants will be deleted. Before this happens, any sub-nodes specified in step 4 (and such sub-nodes' descendants) will be copied. So in effect, an insert is performed, followed by a copy, followed by a delete.

The above technique will work even in the unlikely event that the new element type is not itself a node element. Any attempt to alter a node simply by changing the node's DOCTYPE element will be blocked by the system, which stores the DOCTYPE of each node before the node is edited.

The final constraint is that the node element set cannot be altered for a MALTbase document. If the node elements do need to be adjusted, then the master document must be reassembled. The master document can then be decomposed back into MALTbase form using the new node element set.

FIGS. 10a-10f show a graphical representation of a SQL node write back. FIG. 10a shows an exemplary principal node 1000 relating to a chapter 7 that has first, second, third and fourth parts 1001, 1002, 1003 and 1004, respectively, and a note 1005. Each of the first, second, third and fourth parts 1001, 1002, 1003 and 1004 and the note 1005 has an associated child-id. The first part 1001 has a child-id "1", the second part 1002 has a child-id "4", the third part 1003 has a child-id "7", the fourth part 1004 has a child-id "a", and the note 1005 has a child-id "d". The additional processes accompanying the write-back procedure of a node into the database are now illustrated using the principal node 1000 of FIG. 10a.

The write-back procedure is considered in an example in which: (i) a part of the principal node 1000 of FIG. 10a is replaced with a part from another location; (ii) a part of the principal node 1000 of 10a is duplicated (perhaps as a preliminary to splitting the material into two new parts); and (iii) a completely new part is inserted into the principal node 1000 of FIG. 10a.

FIG. 10b shows the editing of the principal node 1000 to create a modified node 1000a by moving, inserting and deleting placeholders corresponding to existing nodes. New sub-node elements are inserted to create new nodes. A fifth part 1006 from another location replaces the second part 1002 of FIG. 10a. The fourth part 1004 of FIG. 10a is duplicated and the duplicate appears as a new sixth part 1004a. Further, a completely new part 1007 is inserted into the modified node 1000a.

The XML editing application being used (for example, XMetal, Epic, XML Spy) ensures that the new modified node 1000*a* is valid and the MALTbase strategy ensures that the wider document is also valid. When saving the modified node 1000*a* shown in FIG. 10*b*, the following steps occur:

1. Generate a list of placeholders: 1, /8/C/3*b*/2, a, 7, a, d. These placeholders are the child-ids of the parts and the note of the modified node 1000*a*;
2. Generate a list of existing sub-nodes: 1, 4, 7, a, d. These are the child-ids associated with the parts and the note of the node 1000 of FIG. 10*a*;
3. Generate a list of unmatched sub-nodes: 4. Any such sub-node and each such sub-node's associated descendants are deleted In this case, the second part 1002 of FIG. 10*a*, having a child-id of "4", is deleted, along with any of the second part's descendants; and
4. Generate a list of unmatched placeholders: /8/c/3*b*/2, a. Any such nodes having unmatched placeholders are duplicated, along with any associated descendants, and provisional IDs are assigned to the duplicated nodes.

FIG. 10*c* shows the further modified node 1000*b* in which provisional IDs have been assigned to each of the new fifth part 1006 and fourth part 1004. FIG. 10*d* shows the allocation of provisional IDs to any placeholder that is out of order. In this instance, the third part 1003 having a child-id of "7" is deemed to be out of order and a new provisional id of "×3" is assigned.

FIG. 10*e* shows the conversion of any sub-node elements and the replacement of placeholders. The new fifth part 1007 is assigned an id of "×4".

FIG. 10*f* shows the next stage in the write-back process, in which new child IDs are allocated to placeholders and corresponding nodes and any descendants. If all steps are successful, all such modified nodes are saved. If any step fails, the procedure rolls back to the previous state.

An analysis of the above process confirms that, provided all the steps are carried out as a single database transaction, the integrity of the database is retained. If any step fails, the whole operation has to be rolled back and the user prompted to abort or try again. Examples of potential failure include child-id attributes that do not correspond to an existing node, failure to obtain read locks on sub-trees being copied etc. However, since the time that any node (other than the principal node) is locked is only a fraction of a second, deadlocks should be rare given the normal access patterns of users within XML text files. Various techniques (such as analyzing child IDs to minimize node ID modifications) can of course be used to increase efficiency.

General

A strategy and software, to be known as "MALTbase", have been described for converting arbitrary XML data into SQL tables. Unlike conventional object-relational mapping techniques, MALTbase is designed to produce an optimal SQL table set with a minimum of tables and records, but which contains sufficient information for the original XML to be reconstructed on demand. In this way, the performance and management benefits of using SQL are maximized.

MALTbase is a technology which facilitates the storage and maintenance of very large XML documents. It does this by breaking the original (master) document into a large number of nodes, each of which resides in its own sub-document. A MALTbase node is defined to be the content of any of a set of nominated elements (the node element set). The important distinction between a node and an element is that a node does not explicitly contain the content of any sub-node. Instead, the sub-nodes within a node are represented by placeholders, which are empty tags marking the position of a sub-node, and pointing to the relevant sub-node document.

One of the greatest benefits of this system is that the nodes are created in such a way that: if you ensure the validity of each node, then the validity of the entire document is guaranteed. It is difficult to overstate the importance of this point, since this feature allows a user to update a single node in isolation. Provided a user's updates leave the node valid against the DTD (as all good XML editors should), then the user can be confident that the larger document as a whole will also be valid, without having to examine anything outside the scope of the node/s being modified.

Figure 11:
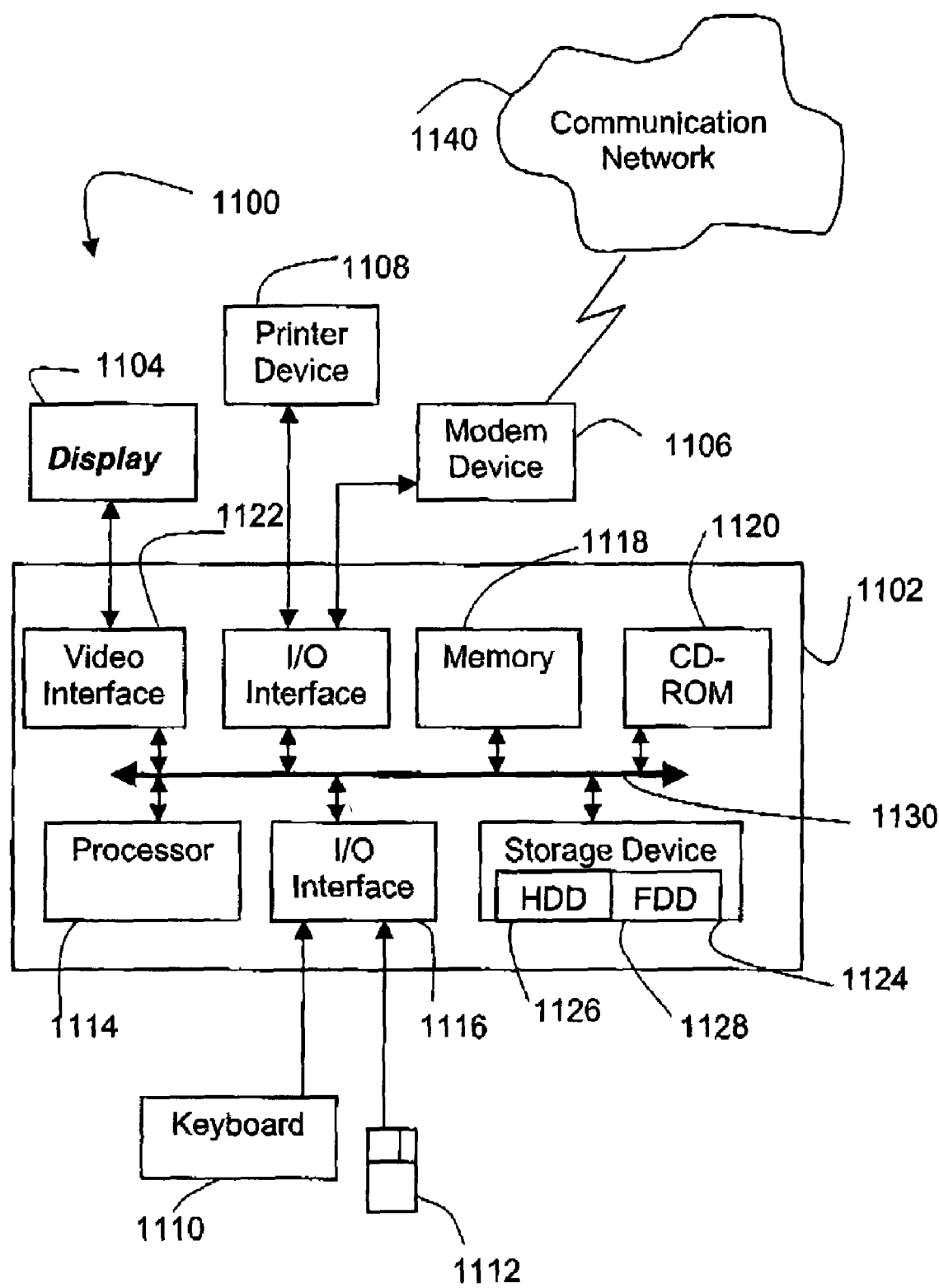
FIG. 11 is a schematic block diagram representation of a general-purpose computer system on which a method for converting XML data into SQL tables may be practised.

The method of converting XML data into SQL tables is preferably practised using a general-purpose computer system 1100, such as that shown in FIG. 11 wherein the processes of FIGS. 3 to 10 may be implemented as software, such as an application program executing within the computer system 1100. In particular, the steps of a method of converting XML data into SQL tables are effected by instructions in the software that are carried out by the computer. The instructions may be formed as one or more code modules, each for performing one or more particular tasks. The software may also be divided into two separate parts, in which a first part performs one or more methods of FIGS. 3 to 10 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for FIGS. 3 to 10.

The computer system 1100 comprises a computer module 1101, input devices such as a keyboard 1102 and mouse 1103, output devices including a printer 1115 and a display device 1114. A Modulator-Demodulator (Modem) transceiver device 1116 is used by the computer module 1101 for communicating to and from a communications network 1120, for example connectable via a telephone line 1121 or other functional medium. The modem 1116 can be used to obtain access to the Internet, and other network systems, such as a Local Area Network (LAN) or a Wide Area Network (WAN).

The computer module 1101 typically includes at least one processor unit 1105, a memory unit 1106, for example formed from semiconductor random access memory (RAM) and read only memory (ROM), input/output (I/O) interfaces including a video interface 1107, and an I/O interface 1113 for the keyboard 1102 and mouse 1103 and optionally a joystick (not illustrated), and an interface 1108 for the modem 1116. A storage device 1109 is provided and typically includes a hard disk drive 1110 and a floppy disk drive 1111. A magnetic tape drive (not illustrated) may also be used. A CD-ROM drive 1112 is typically provided as a non-volatile source of data. The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations or alike computer systems evolved therefrom.

Typically, the application program is resident on the hard disk drive 1110 and read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still farther, the software can also be loaded into the computer system 1100 from other computer readable media. The term "computer readable medium" as used herein refers to any storage or transmission medium that participates in providing instructions and/or data to the computer system 1100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of transmission media include radio or infra-red transmission channels as well as a network connection to another computer or networked device, and the Internet or Intranets including email transmissions and information recorded on websites and the like.

The method of converting XML data into SQL tables may alternatively be implemented in dedicated hardware such as one or more integrated circuits performing the functions or sub functions of FIGS. 3 to 10. Such dedicated hardware may include one or more microprocessors and associated memories.

INDUSTRIAL APPLICABILITY

It is apparent from the above that the arrangements described are applicable to any industry that has a need to efficiently access and/or modify XML encoded text-based data, also referred to as document-centric XML. Examples are the electronic publishing industry, document management, publishers and service providers dealing with requirements engineering documents, journal articles, manuals, software and other online help, etc.

The foregoing describes only some embodiments of the present invention, and modifications and/or changes can be made thereto without departing from the scope and spirit of the invention, the embodiments being illustrative and not restrictive.

We claim:

1. A method for converting a document encoded in a markup language into a format for mapping to a database table, the method comprising:
   replacing the content of at least one node in said document stored in a first storage unit with a placeholder and storing said replaced content in a separate data storage unit associated with the corresponding node, the node being an instance of a node element selected from a node element set; and
   modifying a formal definition of markup rules associated with said document to recognise said placeholder.

2. The method according to claim 1, further comprising:
   ascertaining said node element set corresponding to levels of a hierarchical structure of said document, wherein each node element in said node element set is a discrete level of said hierarchical structure of said document.

3. The method according to claim 1, wherein said placeholder comprises:
   a modified node element name from said node element set; and
   an identifier that indicates a position of a respective node relative to any other children of a parent node of said respective node.

4. The method according to claim 1, wherein said step of modifying comprises:
   replacing each reference to a node in said formal definition of markup rules associated with said document with a combination of said node reference and a reference to a corresponding placeholder associated with a respective node.

5. The method according to claim 1, wherein said markup language is eXtensible Markup Language (XML).

6. The method according to claim 5, wherein said formal definition of markup rules is a Document Type Definition (DTD).

7. The method according to claim 5, wherein said formal definition of markup rules is an XML Schema.

8. The method according to claim 1, wherein said markup language is Standard Generalized Markup Language (SGML).

9. The method according to claim 8, wherein said formal definition of markup rules is a Document Type Definition (DTD).

10. The method according to claim 1, wherein said markup language is a hierarchical markup language.

11. The method according to claim 1, wherein said placeholder is a markup language tag.

12. The method according to claim 11, wherein storing said content comprises:
    providing said separate storage unit for said at least one node;
    inserting as a prefix to said storage unit a standard processing instruction to identify version information of said markup language;
    inserting a command for identifying the associated rules for the markup language having an element corresponding to said node element of which said respective node is an instance, and a public identifier that is distinct and derived from that of said formal definition of markup rules associated with said document to create a new formal definition of markup rules;
    adding a markup language namespace attribute to ensure that placeholders are unique and do not clash with existing markup language tags; and
    replacing any sub-node elements with equivalent empty elements in which the namespace prefix of said namespace attribute has been inserted as a prefix to a tag name,
    wherein the only non-fixed attribute is a child identifier, being the identifier of said respective sub-node relative to children of a parent node of said respective sub-node.

13. The method according to claim 12, further comprising:
    creating a database table having a record for each respective node, wherein each said record includes fields corresponding to an identifier of said node, an identifier of a parent node of said respective node and content associated with said respective node.

14. The method according to claim 13, further comprising:
    locating a node to be edited;
    activating an edit function that locks said node for writing and establishes an edit session in which an editing tool manages content of said node; and
    writing the updated content back into the node record, when the edit session is finished.

15. The method according to claim 14, wherein said edit function is chosen from the group consisting of: modifying an existing node; deleting an existing node (or sub-tree); copying an existing node (or sub-tree) to a new location; creating a new node (or sub-tree); and relocating an existing node (or sub-tree) within a node.

16. The method according to claim 14, further comprising:
saving a modified node, said saving step including the steps of:
generating a list of placeholders in a principal node;
generating a list of existing sub-nodes from a database;
pairing off placeholders and sub-nodes;
deleting from said database any sub-node and any descendants of said sub-node, if that sub-node is not matched against a placeholder;
creating duplicate nodes;
assigning a provisional identifier to each duplicate node, wherein each identifier consists of an identifier associated with said principal node, a provisional child identifier within said principal node, and a trailing portion, if said modified node is a descendant of a node being copied;
scanning the list of matched placeholders in document order;
assigning a provisional child identifier to any placeholder that has a lower child identifier than any one of the siblings of said respective placeholder that have already been scanned;
performing a markup language-to-database conversion on each sub-node element present;
creating new database records for each of said sub-node elements;
assigning a provisional identifier to each new node;
assigning a provisional child identifier within said principal node;
replacing the text of each sub-node element in said principal node with a new placeholder; and
assigning permanent child identifiers to said placeholders to replace the provisional child identifier in each corresponding sub-node.

17. An apparatus for converting a document encoded in a markup language into a format for mapping to a database table, said apparatus comprising:
means for replacing the content of at least one node in said document stored in a first storage unit with a placeholder and storing said replaced content in a separate data storage unit associated with the corresponding node, the node being an instance of a node element selected from a node element set; and
means for modifying a formal definition of markup rules associated with said document to recognise said placeholder.

18. The apparatus according to claim 17, further comprising:
means for ascertaining said node element set corresponding to levels of a hierarchical structure of said document, wherein each node element in said node element set is a discrete level of said hierarchical structure of said document.

19. The apparatus according to claim 17, wherein said placeholder comprises:
a modified node element name from said node element set; and
an identifier that indicates a position of a respective node relative to any other children of a parent node of said respective node.

20. The apparatus according to claim 17, wherein said modifying means comprises:
means for replacing each reference to a node in said formal definition of markup rules associated with said document with a combination of said node reference and a reference to a corresponding placeholder associated with a respective node.

21. The apparatus according to claim 17, wherein said markup language is eXtensible Markup Language (XML).

22. The apparatus according to claim 21, wherein said formal definition of markup rules is a Document Type Definition (DTD).

23. The apparatus according to claim 21, wherein said formal definition of markup rules is an XML Schema.

24. The apparatus according to claim 17, wherein said markup language is Standard Generalized Markup Language (SGML).

25. The apparatus according to claim 24, wherein said formal definition of markup rules is a Document Type Definition (DTD).

26. The method according to claim 17, wherein said markup language is a hierarchical markup language.

27. The apparatus according to claim 17, wherein said placeholder is a markup language tag.

28. The apparatus according to claim 27, wherein said content storing means comprises:
means for providing said separate storage unit for said at least one node;
means for inserting as a prefix to said storage unit a standard processing instruction to identify version information of said markup language;
means for inserting a command for identifying the associated rules for the markup language having an element corresponding to said node element of which said respective node is an instance and a public identifier that is distinct and derived from that of said formal definition of markup rules associated with said document to create a new formal definition of markup rules;
means for adding a markup language namespace attribute to ensure that placeholders are unique and do not clash with existing markup language tags; and
means for replacing any sub-node elements with equivalent empty elements in which the namespace prefix of said namespace attribute has been inserted as a prefix to a tag name, wherein the only non-fixed attribute is a child identifier, being the identifier of said respective sub-node relative to children of a parent node of said respective sub-node.

29. The apparatus according to claim 28, further comprising:
means for creating a database table having a record for each respective node,
wherein each said record includes fields corresponding to an identifier of said node, an identifier of a parent node of said respective node and content associated with said respective node.

30. The apparatus according to claim 29, further comprising:
means for locating a node to be edited;
means for activating an edit function that locks said node for writing and establishes an edit session in which an editing tool manages content of said node; and
means for writing the updated content back into the node record, when the edit session is finished.

31. The apparatus according to claim 30, wherein said edit function is chosen from the group consisting of: modifying an existing node; deleting an existing node (or sub-tree);

copying an existing node (or sub-tree) to a new location; creating a new node (or sub-tree); and relocating an existing node (or sub-tree) within a node.

32. The apparatus according to claim 30, further comprising:
   means for saving a modified node, said saving means including:
      means for generating a list of placeholders in a principal node;
      means for generating a list of existing sub-nodes from a database;
      means for pairing off placeholders and sub-nodes;
      means for deleting from said database any sub-node and any descendants of said sub-node, if that sub-node is not matched against a placeholder;
      means for creating duplicate nodes;
      means for assigning a provisional identifier to each duplicate node, wherein each identifier consists of an identifier associated with said principal node, a provisional child identifier within said principal node, and a trailing portion, if said modified node is a descendant of a node being copied;
      means for scanning the list of matched placeholders in document order;
      means for assigning a provisional child identifier to any placeholder that has a lower child identifier than any one of the siblings of said respective placeholder that have already been scanned;
      means for performing a markup language-to-database conversion on each sub-node element present;
      means for creating new database records for each of said sub-node elements;
      means for assigning a provisional identifier to each new node;
      means for assigning a provisional child identifier within said principal node,
      means for replacing the text of each sub-node element in said principal node with a new placeholder; and
      means for assigning permanent child identifiers to said placeholders to replace the provisional child identifier in each corresponding sub-node.

33. A computer program product having a computer readable medium having a computer program recorded therein for converting a document encoded in a markup language into a format for mapping to a database table, said computer program product comprising:
   computer program code means for replacing the content of at least one node in said document stored in a first storage unit with a placeholder and storing said replaced content in a separate data storage unit associated with the corresponding node, the node being an instance of a node element selected from a node element set; and
   computer program code means for modifying a formal definition of markup rules associated with said document to recognise said placeholder.

34. The computer program product according to claim 33, further comprising:
   computer program code means for ascertaining said node element set corresponding to levels of a hierarchical structure of said document, wherein each node element in said node element set is a discrete level of said hierarchical structure of said document.

35. The computer program product according to claim 33, wherein said placeholder comprises:
   a modified node element name from said node element set; and
   an identifier that indicates a position of a respective node relative to any other children of a parent node of said respective node.

36. The computer program product according to claim 33, wherein said modifying means comprises:
   computer program code means for replacing each reference to a node in said formal definition of markup rules associated with said document with a combination of said node reference and a reference to a corresponding placeholder associated with a respective node.

37. The computer program product according to claim 33, wherein said markup language is eXtensible Markup Language (XML).

38. The computer program product according to claim 37, wherein said formal definition of markup rules is a Document Type Definition (DTD).

39. The computer program product according to claim 37, wherein said formal definition of markup rules is an XML Schema.

40. The computer program product according to claim 33, wherein said markup language is Standard Generalized Markup Language (SGML).

41. The computer program product according to claim 40, wherein said formal definition of markup rules is a Document Type Definition (DTD).

42. The computer program product according to claim 33, wherein said markup language is a hierarchical markup language.

43. The computer program product according to claim 33, wherein said placeholder is a markup language tag.

44. The computer program product according to claim 43, wherein said computer program code means for storing said content comprises:
   computer program code means for providing said separate storage unit for said at least one node;
   computer program code means for inserting as a prefix to said storage unit a standard processing instruction to identify version information of said markup language;
   computer program code means for inserting a command for identifying the associated rules for the markup language having an element corresponding to said node element of which said respective node is an instance, and a public identifier that is distinct and derived from that of said formal definition of markup rules associated with said document to create a new formal definition of markup rules;
   computer program code means for adding a markup language namespace attribute to ensure that placeholders are unique and do not clash with existing markup language tags; and
   computer program code means for replacing any sub-node elements with equivalent empty elements in which the namespace prefix of said namespace attribute has been inserted as a prefix to a tag name, wherein the only non-fixed attribute is a child identifier, being the identifier of said respective sub-node relative to children of a parent node of said respective sub-node.

45. The computer program product according to claim 44, further comprising:
   computer program code means for creating a database table having a record for each respective node, wherein each said record includes fields corresponding to an identifier of said node, an identifier of a parent node of said respective node and content associated with said respective node.

46. The computer program product according to claim 45, further comprising:

computer program code means for locating a node to be edited;

computer program code means for activating an edit function that locks said node for writing and establishes an edit session in which an editing tool manages content of said node; and computer program code means for writing the updated content back into the node record, when the edit session is finished.

47. The computer program product according to claim 46, wherein said edit function is chosen from the group consisting of: modifying an existing node; deleting an existing node (or sub-tree); copying an existing node (or sub-tree) to a new location; creating a new node (or sub-tree); and relocating an existing node (or sub-tree) within a node.

48. The computer program product according to claim 46, further comprising:

computer program code means for saving a modified node, said computer program product for saving including:

computer program code means for generating a list of placeholders in a principal node;

computer program code means for generating a list of existing sub-nodes from a database;

computer program code means for pairing off placeholders and sub-nodes;

computer program code means for deleting from said database any sub-node and any descendants of said sub-node, if that sub-node is not matched against a placeholder;

computer program code means for creating duplicate nodes;

computer program code means for assigning a provisional identifier to each duplicate node, wherein each identifier consists of an identifier associated with said principal node, a provisional child identifier within said principal node, and a trailing portion, if said modified node is a descendant of a node being copied;

computer program code means for scanning the list of matched placeholders in document order;

computer program code means for assigning a provisional child identifier to any placeholder that has a lower child identifier than any one of the siblings of said respective placeholder that have already been scanned;

computer program code means for performing a markup language-to-database conversion on each sub-node element present;

computer program code means for creating new database records for each of said sub-node elements;

computer program code means for assigning a provisional identifier to each new node;

computer program code means for assigning a provisional child identifier within said principal node;

computer program code means for replacing the text of each sub-node element in said principal node with a new placeholder; and computer program code means for assigning permanent child identifiers to said placeholders to replace the provisional child identifier in each corresponding sub-node.

49. An apparatus for converting a document encoded in a markup language into a format for mapping to a database table, said apparatus comprising:

a device for replacing the content of at least one node in said document stored in a first storage unit with a placeholder and storing said replaced content in a separate data storage unit associated with the corresponding node, the node being an instance of a node element selected from a node element set; and a device for modifying a formal definition of markup rules associated with said document to recognise said placeholder.

50. The apparatus according to claim 49, further comprising:

a device for ascertaining said node element set corresponding to levels of a hierarchical structure of said document, wherein each node element in said node element set is a discrete level of said hierarchical structure of said document.

51. The apparatus according to claim 49, wherein said placeholder comprises:

a modified node element name from said node element set; and an identifier that indicates a position of a respective node relative to any other children of a parent node of said respective node.

52. The apparatus according to claim 49, wherein said modifying device comprises:

a device for replacing each reference to a node in said formal definition of markup rules associated with said document with a combination of said node reference and a reference to a corresponding placeholder associated with a respective node.

53. The apparatus according to claim 49, wherein said markup language is eXtensible Markup Language (XML).

54. The apparatus according to claim 53, wherein said formal definition of markup rules is a Document Type Definition (DTD).

55. The apparatus according to claim 53, wherein said formal definition of markup rules is an XML Schema.

56. The apparatus according to claim 49, wherein said markup language is Standard Generalized Markup Language (SGML).

57. The apparatus according to claim 56, wherein said formal definition of markup rules is a Document Type Definition (DTD).

58. The method according to claim 49, wherein said markup language is a hierarchical markup language.

59. The apparatus according to claim 49, wherein said placeholder is a markup language tag.

60. The apparatus according to claim 59, wherein said content storing device comprises:

a device for providing said separate storage unit for said at least one node;

a device for inserting as a prefix to said storage unit a standard processing instruction to identify version information of said markup language;

a device for inserting a command for identifying the associated rules for the markup language having an element corresponding to said node element of which said respective node is an instance, and a public identifier that is distinct and derived from that of said formal definition of markup rules associated with said document to create a new formal definition of markup rules;

a device for adding a markup language namespace attribute to ensure that placeholders are unique and do not clash with existing markup language tags; and a device for replacing any sub-node elements with equivalent empty elements in which the namespace prefix of said namespace attribute has been inserted as a prefix to a tag name, wherein the only non-fixed attribute is a child identifier, being the identifier of said respective sub-node relative to children of a parent node of said respective sub-node.

61. The apparatus according to claim 60, further comprising:
a device for creating a database table having a record for each respective node,
wherein each said record includes fields corresponding to an identifier of said node, an identifier of a parent node of said respective node and content associated with said respective node.

62. The apparatus according to claim 61, further comprising:
a device for locating a node to be edited;
a device for activating an edit function that locks said node for writing and establishes an edit session in which an editing tool manages content of said node; and
a device for writing the updated content back into the node record, when the edit session is finished.

63. The apparatus according to claim 62, wherein said edit function is chosen from the group consisting of: modifying an existing node; deleting an existing node (or sub-tree); copying an existing node (or sub-tree) to a new location; creating a new node (or sub-tree); and relocating an existing node (or sub-tree) within a node.

64. The apparatus according to claim 62, further comprising:
a device for saving a modified node, said saving device including:
a device for generating a list of placeholders in a principal node;
a device for generating a list of existing sub-nodes from a database;
a device for pairing off placeholders and sub-nodes;
a device for deleting from said database any sub-node and any descendants of said sub-node, if that sub-node is not matched against a placeholder;
a device for creating duplicate nodes;
a device for assigning a provisional identifier to each duplicate node, wherein each identifier consists of an identifier associated with said principal node, a provisional child identifier within said principal node, and a trailing portion, if said modified node is a descendant of a node being copied;
a device for scanning the list of matched placeholders in document order;
a device for assigning a provisional child identifier to any placeholder that has a lower child identifier than any one of the siblings of said respective placeholder that have already been scanned;
a device for performing a markup language-to-database conversion on each sub-node element present;
a device for creating new database records for each of said sub-node elements;
a device for assigning a provisional identifier to each new node;
a device for assigning a provisional child identifier within said principal node;
a device for replacing the text of each sub-node element in said principal node with a new placeholder; and
a device for assigning permanent child identifiers to said placeholders to replace the provisional child identifier in each corresponding sub-node.

65. A computer program product having a computer readable medium having a computer program recorded therein for converting a document encoded in a markup language into a format for mapping to a database table, said computer program product comprising:
computer program code for replacing the content of at least one node in said document stored in a first storage unit with a placeholder and storing said replaced content in a separate data storage unit associated with the corresponding node, the node being an instance of a node element selected from a node element set; and
computer program code for modifying a formal definition of markup rules associated with said document to recognise said placeholder.

66. The computer program product according to claim 65, further comprising:
computer program code for ascertaining said node element set corresponding to levels of a hierarchical structure of said document, wherein each node element in said node element set is a discrete level of said hierarchical structure of said document.

67. The computer program product according to claim 65, wherein said placeholder comprises:
a modified node element name from said node element set; and
an identifier that indicates a position of a respective node relative to any other children of a parent node of said respective node.

68. The computer program product according to claim 65, wherein said modifying code comprises:
computer program code for replacing each reference to a node in said formal definition of markup rules associated with said document with a combination of said node reference and a reference to a corresponding placeholder associated with a respective node.

69. The computer program product according to claim 65, wherein said markup language is eXtensible Markup Language (XML).

70. The computer program product according to claim 69, wherein said formal definition of markup rules is a Document Type Definition (DTD).

71. The computer program product according to claim 69, wherein said formal definition of markup rules is an XML Schema.

72. The computer program product according to claim 65, wherein said markup language is Standard Generalized Markup Language (SGML).

73. The computer program product according to claim 72, wherein said formal definition of markup rules is a Document Type Definition (DTD).

74. The computer program product according to claim 65, wherein said markup language is a hierarchical markup language.

75. The computer program product according to claim 65, wherein said placeholder is a markup language tag.

76. The computer program product according to claim 75, wherein said computer program code for storing said content comprises:
computer program code for providing said separate storage unit for said at least one node;
computer program code for inserting as a prefix to said storage unit a standard processing instruction to identify version information of said markup language;

computer program code for inserting a command for identifying the associated rules for the markup language having an element corresponding to said node element of which said respective node is an instance, and a public identifier that is distinct and derived from that of said formal definition of markup rules associated with said document to create a new formal definition of markup rules;

computer program code for adding a markup language namespace attribute to ensure that placeholders are unique and do not clash with existing markup language tags; and computer program code for replacing any sub-node elements with equivalent empty elements in which the namespace prefix of said namespace attribute has been inserted as a prefix to a tag name, wherein the only non-fixed attribute is a child identifier, being the identifier of said respective sub-node relative to children of a parent node of said respective sub-node.

77. The computer program product according to claim 76, further comprising:

computer program code for creating a database table having a record for each respective node, wherein each said record includes fields corresponding to an identifier of said node, an identifier of a parent node of said respective node and content associated with said respective node.

78. The computer program product according to claim 77, further comprising:

computer program code for locating a node to be edited;

computer program code for activating an edit function that locks said node for writing and establishes an edit session in which an editing tool manages content of said node; and computer program code for writing the updated content back into the node record, when the edit session is finished.

79. The computer program product according to claim 78, wherein said edit function is chosen from the group consisting of: modifying an existing node; deleting an existing node (or sub-tree); copying an existing node (or sub-tree) to a new location; creating a new node (or sub-tree); and relocating an existing node (or sub-tree) within a node.

80. The computer program product according to claim 78, further comprising:

computer program code for saving a modified node, said computer program product for saving including:

computer program code for generating a list of placeholders in a principal node;

computer program code for generating a list of existing sub-nodes from a database;

computer program code for pairing off placeholders and sub-nodes;

computer program code for deleting from said database any sub-node and any descendants of said sub-node, if that sub-node is not matched against a placeholder;

computer program code for creating duplicate nodes;

computer program code for assigning a provisional identifier to each duplicate node, wherein each identifier consists of an identifier associated with said principal node, a provisional child identifier within said principal node, and a trailing portion, if said modified node is a descendant of a node being copied;

computer program code for scanning the list of matched placeholders in document order;

computer program code for assigning a provisional child identifier to any placeholder that has a lower child identifier than any one of the siblings of said respective placeholder that have already been scanned;

computer program code for performing a markup language-to-database conversion on each sub-node element present;

computer program code for creating new database records for each of said sub-node elements;

computer program code for assigning a provisional identifier to each new node;

computer program code for assigning a provisional child identifier within said principal node;

computer program code for replacing the text of each sub-node element in said principal node with a new placeholder; and computer program code for assigning permanent child identifiers to said placeholders to replace the provisional child identifier in each corresponding sub-node.

* * * * *